US010694179B2

(12) United States Patent
Hermansson et al.

(10) Patent No.: US 10,694,179 B2
(45) Date of Patent: Jun. 23, 2020

(54) VIDEO CODING USING HYBRID INTRA PREDICTION

(71) Applicant: TELEFONAKTIEBOLAGET LM ERICSSON (PUBL), Stockholm (SE)

(72) Inventors: Per Hermansson, Årsta (SE); Kenneth Andersson, Gävle (SE); Signe Sidwall Thygesen, Södertälje (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/069,346

(22) PCT Filed: Dec. 22, 2016

(86) PCT No.: PCT/SE2016/051306
§ 371 (c)(1),
(2) Date: Jul. 11, 2018

(87) PCT Pub. No.: WO2017/123133
PCT Pub. Date: Jul. 20, 2017

(65) Prior Publication Data
US 2019/0037213 A1    Jan. 31, 2019

Related U.S. Application Data

(60) Provisional application No. 62/277,697, filed on Jan. 12, 2016.

(51) Int. Cl.
*H04N 19/593* (2014.01)
*H04N 19/61* (2014.01)
(Continued)

(52) U.S. Cl.
CPC ......... *H04N 19/105* (2014.11); *H04N 19/107* (2014.11); *H04N 19/11* (2014.11);
(Continued)

(58) Field of Classification Search
CPC ............................. H04N 19/105; H04N 19/11
See application file for complete search history.

(56) References Cited

U.S. PATENT DOCUMENTS 9,167,268 B1 * 10/2015 Gu ........................ H04N 19/172
9,185,414 B1 * 11/2015 Suvanto ............... H04N 19/139
(Continued)

OTHER PUBLICATIONS

International Search Report and Written Opinion dated Mar. 30, 2017 issued in International Patent Application No. PCT/SE2016/051306. (14 pages).
(Continued)

*Primary Examiner* — Irfan Habib
(74) *Attorney, Agent, or Firm* — Rothwell, Figg, Ernst & Manbeck, P.C.

(57) ABSTRACT

One exemplary embodiment presents a method of decoding a group of image elements in a frame of an encoded video sequence. The method comprises determining an intra-prediction mode for the group of image elements, and providing a first prediction of the group of image elements according to the determined intra-prediction mode. The method further comprises determining a location identifier identifying a location of a decoded version of another group of image elements in a frame of the video sequence, and providing a second prediction of the group of image elements using the determined location identifier. Further, the method comprises identifying which subset of a plurality of subsets of intra-prediction modes contains the determined intra-prediction mode, wherein each subset corresponds to a first weighting and a second weighting assigned for all intra-prediction modes of that subset, and wherein different subsets are assigned different first weightings and different second weightings, and applying at least one of the first weighting assigned to the identified subset to the first prediction to generate a first weighted prediction and the
(Continued)

second weighting assigned to the identified subset to the second prediction to generate a second weighted prediction. The method further comprises generating a decoded version of the group of image elements using a combination of the first prediction and the second weighted prediction or using a combination of the first weighted prediction and the second prediction or using a combination of the first weighted prediction and the second weighted prediction.

22 Claims, 13 Drawing Sheets

(51) Int. Cl.
| | | |
|---|---|---|
| *H04N 19/107* | (2014.01) | |
| *H04N 19/105* | (2014.01) | |
| *H04N 19/11* | (2014.01) | |
| *H04N 19/176* | (2014.01) | |
| *H04N 19/503* | (2014.01) | |
| *H04N 19/157* | (2014.01) | |

(52) U.S. Cl.
CPC ......... *H04N 19/157* (2014.11); *H04N 19/176* (2014.11); *H04N 19/503* (2014.11); *H04N 19/593* (2014.11); *H04N 19/61* (2014.11)

(56) References Cited

U.S. PATENT DOCUMENTS

| | | | | |
|---|---|---|---|---|
| 9,462,272 | B2 * | 10/2016 | Lee | H04N 19/593 |
| 9,485,504 | B2 * | 11/2016 | Lai | H04N 19/50 |
| 9,531,990 | B1 * | 12/2016 | Wilkins | H04N 7/00 |
| 9,609,343 | B1 * | 3/2017 | Chen | H04N 19/107 |
| 9,641,836 | B2 * | 5/2017 | Li | H04N 19/34 |
| 9,781,447 | B1 * | 10/2017 | Bultje | H04N 19/186 |
| 9,813,733 | B2 * | 11/2017 | Gao | H04N 19/593 |
| 9,854,262 | B2 * | 12/2017 | Park | H04N 19/159 |
| 10,051,284 | B2 * | 8/2018 | Won | H04N 19/46 |
| 2009/0257492 | A1 * | 10/2009 | Andersson | H04N 19/105 375/240.12 |
| 2012/0163450 | A1 * | 6/2012 | Davies | H04N 19/182 375/240.03 |
| 2013/0051467 | A1 * | 2/2013 | Zhou | H04N 19/105 375/240.13 |
| 2015/0237378 | A1 * | 8/2015 | Wu | H04N 19/149 375/240.03 |

OTHER PUBLICATIONS

Cha et al., "Improved Combined Inter-Intra Prediction Using Spatial-Variant Weighted Coefficient", Multimedia and Expo (ICME), 2011 IEEE International Conference, IEEE, ISBN: 978-1-61284-350-6 (Jul. 11, 2011). (5 pages).

Chen et al., "Joint Inter-Intra Prediction Based on Mode-Variant and Edge-Directed Weighting Approaches in Video Coding", 2014 IEEE International Conference on Acoustics, Speech and Signal Processing (ICASSP), May 4, 2014, p. 7372-7376, Sections 1 and 2, ISBN: 978-1-4799-2893-4 (May 4, 2014). (5 pages).

Zhang et al., "Hybrid Angular Intra/Template Matching Prediction for HEVC Intra Coding", 2015 Visual Communications and Image Processing (VCIP), IEEE, ISBN: 978-1-4673-7314-2 (Dec. 13, 2015). (4 pages).

* cited by examiner

VIDEO CODING USING HYBRID INTRA PREDICTION

CROSS REFERENCE TO RELATED APPLICATION(S)

This application is a 35 U.S.C. § 371 National Stage of International Patent Application No. PCT/SE2016/051306, filed Dec. 22, 2016, designating the United States and claiming priority to U.S. provisional application No. 62/277,697, filed on Jan. 12, 2016. The above identified applications are incorporated by reference.

TECHNICAL FIELD

The solution presented herein generally relates to video data management, and to encoding and decoding of video sequences. In particular, the solution relates to methods of encoding and decoding, decoder, encoder, decoder apparatus, encoder apparatus, and computer program products.

BACKGROUND

Video compression is about reducing and removing redundant information from the video data. Typically information from neighboring image elements or pixels, both within a picture but also from previous coded pictures, are used to make a prediction of the video. Because the compression process is lossy, i.e., you lose information about the video sequence, the reconstructed video will always differ from the original video in some way. A major goal of any video codec standard is to provide tools to hide or minimize those distortions while still maintaining a high compression ratio to get the size of the video file as small as possible.

Pixel or image element prediction is an important part of video coding standards such as H.261, H.263, MPEG-4 and H.264 (ITU-T Rec. H.264 and ISO/IEC 14496-10, "Advanced Video Coding," 2003). In H.264 there are three pixel prediction methods utilized, namely intra, inter and bi-prediction. Intra-prediction provides a spatial prediction of the current block from previously decoded pixels of a current frame. Inter-prediction gives a temporal prediction of the current block using a corresponding but displaced block in a previously decoded frame.

In state of the art video codecs intra-prediction is an important method for creating a prediction of image elements for the current block. Since the intra-coding tends to transport most of the signal energy in the video bit stream, any improvements on the prediction and coding methods is important for the reduction of the bits needed when compressing a video sequence.

Intra-prediction uses reference image elements neighboring the current block to predict blocks within the same frame. The order in which the blocks are encoded is from the upper left corner and then row-wise through the whole frame. Therefore, already encoded image elements in the frame will be to the upper left of the next block. Intra-prediction takes this into consideration when using the image elements to the left and above the block to predict image elements within the block. In the latest standard, HEVC, the intra-prediction consists of three steps: reference image element array construction, image element prediction, and post-processing. Intra-prediction can be classified into two categories: Angular prediction methods and DC/planar prediction methods. The first category is illustrated in FIG. 1 and is supposed to model structures with directional edges, and the second category estimates smooth image content.

The idea of reusing blocks within the same frame to remove redundant data has also later been proven efficient for screen content coding. Intra-Block Copy (IntraBC) is a method in state of the art video codecs where a block in an image is predicted as a displacement from already reconstructed blocks in the same image. It removes redundancy from repeating patterns, which typically occur in text and graphic regions, and therefore IntraBC is today mostly used for compressing screen content and computer graphics. The cost of encoding time increases compared to intra-prediction because of the search involved in intra-block matching. The most similar block in a specified search area next to the current block is found by comparing the blocks with some metric, where the calculation of sum of squared error or difference (SSD) is often included in the metric. This method is similar to the inter-prediction method in HEVC, where blocks from other reference frames are reused to predict blocks in the current frame, the major difference being that in IntraBC the referenced blocks comes from within the same frame as the current block.

More specifically, in intra-prediction, image elements neighboring the current block are used to create a prediction of the current block according to the intra-prediction mode. In intra-block copy prediction, reference image elements positioned relative to the current block by a block vector are copied to create a prediction of the current block. In inter-prediction, reference image elements, positioned relative to the current block by a motion vector, from previously decoded pictures are copied directly or an interpolated version is used to predict the current block. Inter-prediction also allows bi-prediction of two independent reference blocks using two independent motion vectors, the reference blocks, potentially interpolated, are then combined. The intra and inter-predictions can be re-generated on the decoder side because the intra-prediction mode and the displacement vector are typically included with the coded bit stream.

In the current state of the art video codecs template matching is a technique for the encoder to be able to reference a block of previous coded samples without having to signal a displacement vector for indicating the position. For this to work a template area of image elements neighboring the current block is selected by both the encoder and decoder using pre-determined information, which could, e.g., be signaled in a slice header or Picture Parameter Set (PPS). A search area of a size that has also been pre-determined, e.g., from a slice header or from a PPS or defined during a decoding process in a codec specification, is searched. For each location in the search area, an error metric is computed between the image elements at the search location and the image elements in the template area. The location that resulted in the lowest error metric is then selected as the final location, and the image elements at the location will then be used for creating a prediction of the current block. This process is performed by both the encoder and decoder to ensure that the same image elements are used for the prediction.

In template matching, both the encoder and the decoder determine from which reference image elements the current block shall be predicted. Template matching is used to find previously coded blocks that are similar to the current one by finding locations where the neighboring image elements are similar to the neighboring image elements of the current block. Image elements from the found location can then be used without having to send a displacement vector to indicate the position of the reference block.

Multiple reference pictures may be used for inter-prediction with a reference picture index to indicate which of the multiple reference pictures is used. In the P-type of inter encoding, only single directional prediction is used, and the allowable reference pictures are managed in list 0. However, in the B-type of inter encoding, two lists of reference pictures are managed, list 0 and list 1. In such B-type pictures, single directional prediction using either list 0 or list 1 is allowed, or bi-predictions using an average of a reference picture from list 0 and another reference picture from list 1 may be used.

The weighted prediction in H.264 represents a weight for respectively bi-directional prediction and also a DC offsets for the weighted combination in the slice header. The general formula for using weighting factors in inter-prediction is:

$$P=((w_0 P_0 + w_1 P_1) \gg \text{Shift}) + DC, \quad (1)$$

where $P_0$ and $w_0$ respectively represent the list 0 initial predictor and weighting factor, and where $P_1$ and $w_1$ respectively represent the list 1 initial predictor and weighting factor. DC represents an offset that is defined per frame basis, Shift represent a shifting factor, and $\gg$ Shift represents right shift by Shift. In the case of bi-directional prediction $w_0 = w_1 = 0.5$.

PCT publication WO 2004/064255, titled "Mixed Inter/Intra Video Coding of Macroblock Partitions" and filed 6 Jan. 2004 suggests a hybrid intra-inter bi-predictive coding mode that allows both intra and inter frame predictions to be combined together for hybrid-encoding a macroblock. In this hybrid coding, an average of selected intra and inter-predictions or a differently weighted combination of the intra and inter-predictions is used. The hybrid coding suggested in WO 2004/064255 basically uses a summing of the two input intra and inter-predictions or uses slice-specific weights. Thus, the same weight is applied to all pixels in all macroblocks of a slice that is used as inter and/or intra-prediction. Such an approach is far from optimal from an image quality point of view.

Further, intra-prediction can only predict simple structures in the original block as only one row and one column of an image elements are used from the neighboring blocks. Thus, intra-prediction provides useful low frequency information. It is not possible to represent more complex structures and high frequency information, however, using the intra-prediction modes (current angular directions, planar, and dc predictions) in state of the art video codecs. Template matching and intra-block copy can retain more structure and higher frequency information but will often lead to large discontinuous at the border between the current block and neighboring blocks.

For at least these reasons, alternate solutions are desired to improve the encoding and decoding of video sequences.

SUMMARY

The solution presented herein addresses these problems by combining predictions of groups of image elements, where at least one prediction is emphasized (e.g., weighted) over another. By combining the two predictions in this manner, the solution presented herein improves the prediction of more complex structures in the original group while minimizing artificial edges introduced at the group boundaries.

One exemplary embodiment presents a method of decoding a group of image elements in a frame of an encoded video sequence. The method comprises determining an intra-prediction mode for the group of image elements, and providing a first prediction of the group of image elements according to the determined intra-prediction mode. The method further comprises determining a location identifier identifying a location of a decoded version of another group of image elements in a frame of the video sequence, and providing a second prediction of the group of image elements using the determined location identifier. Further, the method comprises identifying which subset of a plurality of subsets of intra-prediction modes contains the determined intra-prediction mode, wherein each subset corresponds to a first weighting and a second weighting assigned for all intra-prediction modes of that subset, and wherein different subsets are assigned different first weightings and different second weightings, and applying at least one of the first weighting assigned to the identified subset to the first prediction to generate a first weighted prediction and the second weighting assigned to the identified subset to the second prediction to generate a second weighted prediction. The method further comprises generating a decoded version of the group of image elements using a combination of the first prediction and the second weighted prediction or using a combination of the first weighted prediction and the second prediction.

Another exemplary embodiment presents a decoder comprising a mode circuit, a first prediction circuit, a second prediction circuit, a weighting circuit, and a decoding circuit. The mode circuit is configured to determine an intra-prediction mode for a group of image elements in a frame of a video sequence, and to determine a location identifier identifying a location of a decoded version of another group of image elements in a frame of the video sequence. The first prediction circuit is configured to provide a first prediction of the group of image elements using intra-prediction according to the determined intra-prediction mode. The second prediction circuit is configured to provide a second prediction of the group of image elements using the determined location identifier. The weighting circuit is configured to identify which subset of a plurality of subsets of intra-prediction modes contains the determined intra-prediction mode. Each subset corresponds to a first weighting and a second weighting assigned for all intra-prediction modes of that subset, and different subsets are assigned different first weightings and different second weightings. The weighting circuit is further configured to apply at least one of the first weighting assigned to the identified subset to the first prediction to generate a first weighted prediction and the second weighting assigned to the identified subset to the second prediction to generate a second weighted prediction. The decoding circuit is configured to generate a decoded version of the group of image elements using a combination of the first prediction and the second weighted prediction or using a combination of the first weighted prediction and the second prediction.

Another exemplary embodiment presents a computer program product stored in a non-transitory computer readable medium for controlling a decoding processor. The computer program product comprises software instructions which, when run on the decoding processor, causes the decoder to determine an intra-prediction mode for the group of image elements, provide a first prediction of the group of image elements according to the determined intra-prediction mode, determine a location identifier identifying a location of a decoded version of another group of image elements in a frame of the video sequence, and provide a second prediction of the group of image elements using the determined location identifier. When run on the decoding processor, the software instructions further cause the decoding processor to identify which subset of a plurality of subsets of intra-prediction modes contains the determined intra-prediction mode. Each subset corresponds to a first weighting and a second weighting assigned for all intra-prediction modes of that subset, and different subsets are assigned different first weightings and different second weightings. When run on the decoding processor, the software instructions further cause the decoding processor to apply at least one of the first weighting assigned to the identified subset to the first prediction to generate a first weighted prediction and the second weighting assigned to the identified subset to the second prediction to generate a second weighted prediction, and generate a decoded version of the group of image elements using a combination of the first prediction and the second weighted prediction or using a combination of the first weighted prediction and the second prediction.

Another exemplary embodiment presents a decoding apparatus comprising a mode module, a first prediction module, a second prediction module, a weighting module, and a decoding module. The mode module is configured to determine an intra-prediction mode for a group of image elements in a frame of a video sequence, and to determine a location identifier identifying a location of a decoded version of another group of image elements in a frame of the video sequence. The first prediction module is configured to provide a first prediction of the group of image elements using intra-prediction according to the determined intra-prediction mode. The second prediction module is configured to provide a second prediction of the group of image elements using the determined location identifier. The weighting module is configured to identify which subset of a plurality of subsets of intra-prediction modes contains the determined intra-prediction mode. Each subset corresponds to a first weighting and a second weighting assigned for all intra-prediction modes of that subset, and different subsets are assigned different first weightings and different second weightings. The weighting module is further configured to apply at least one of the first weighting assigned to the identified subset to the first prediction to generate a first weighted prediction and the second weighting assigned to the identified subset to the second prediction to generate a second weighted prediction. The decoding module is configured to generate a decoded version of the group of image elements using a combination of the first prediction and the second weighted prediction or using a combination of the first weighted prediction and the second prediction.

In some embodiments, the decoder or decoder apparatus is comprised in a device, including but not limited to, a tablet, personal computer, mobile telephone, set-top box, and camera.

Another exemplary embodiment presents a method of encoding a group of image elements in a frame of a video sequence. The method comprises selecting an intra-prediction mode for a first group of image elements, and identifying which subset of a plurality of subsets of intra-prediction modes contains the selected intra-prediction mode. Each subset corresponds to a first weighting and a second weighting calculated for all intra-prediction modes of that subset, and different first weightings and different second weightings are calculated for different subsets. The method further comprises estimating a first prediction of the first group of image elements using intra-prediction according to the selected intra-prediction mode, and applying the first weighting assigned to the identified subset to the first prediction to generate a first weighted prediction. Further, the method comprises estimating a plurality of second weighted predictions by applying the second weighting for the identified subset to each of a second group of image elements previously encoded and proximate the first group of image elements, where each of the second group of image elements is located at a different location from the first group of image elements, and determining a plurality of candidate predictions. Each candidate prediction comprises a combination of the first prediction and one of the plurality of second weighted predictions or a combination of the first weighted prediction and one of the second group of image elements. The method further comprises selecting the candidate prediction having a better performance parameter than the other candidate predictions, and encoding the first group of image elements as an identifier of the selected intra-prediction mode and an identifier of the location of the second group of image elements corresponding to the selected candidate prediction.

Another exemplary embodiment presents an encoder comprising a mode selection circuit, a weighting circuit, a first prediction circuit, a second prediction circuit, and an evaluation circuit. The mode selection circuit is configured to select an intra-prediction mode for a first group of image elements in a frame of a video sequence. The weighting circuit is configured to identify which subset of a plurality of subsets of intra-prediction modes contains the selected intra-prediction mode. Each subset corresponds to a first weighting and a second weighting calculated for all intra-prediction modes of that subset, and different first weightings and different second weightings are calculated for different subsets. The first prediction circuit is configured to estimate a first prediction of the first group of image elements using intra-prediction according to the selected intra-prediction mode, and apply the first weighting assigned to the identified subset to the first prediction to generate a first weighted prediction. The second prediction circuit is configured to estimate a plurality of second weighted predictions by applying the second weighting for the identified subset to each of a second group of image elements previously encoded and proximate the first group of image elements. Each of the second group of image elements is located at a different location from the first group of image elements. The evaluation circuit is configured to determine a plurality of candidate predictions, where each candidate prediction comprises a combination of the first prediction and one of the plurality of second weighted predictions or a combination of the first weighed prediction and one of the second group of image elements. The evaluation circuit is further configured to select the candidate prediction having a better performance parameter than the other candidate predictions, and encode the first group of image elements as an identifier of the selected intra-prediction mode and an identifier of the location of the second group of image elements corresponding to the selected candidate prediction.

Another exemplary embodiment presents a computer program product stored in a non-transitory computer readable medium for controlling an encoding processor. The computer program product comprises software instructions which, when run on the encoding processor, causes the encoding processor to select an intra-prediction mode for a first group of image elements, and identify which subset of a plurality of subsets of intra-prediction modes contains the selected intra-prediction mode. Each subset corresponds to a first weighting and a second weighting calculated for all intra-prediction modes of that subset, and different first weightings and different second weightings are calculated for different subsets. When run on the encoding processor, the software instructions further control the encoding processor to estimate a first prediction of the first group of image elements using intra-prediction according to the selected intra-prediction mode, apply the first weighting assigned to the identified subset to the first prediction to generate a first weighted prediction, and estimate a plurality of second weighted predictions by applying the second weighting for the identified subset to each of a second group of image elements previously encoded and proximate the first group of image elements. Each of the second group of image elements is located at a different location from the first group of image elements. When run on the encoding processor, the software instructions further control the encoding processor to determine a plurality of candidate predictions, where each candidate prediction comprises a combination of the first prediction and one of the plurality of second weighted predictions or a combination of the first weighted prediction and one of the second group of image elements. When run on the encoding processor, the software instructions further control the encoding processor to select the candidate prediction having a better performance parameter than the other candidate predictions, and encode the first group of image elements as an identifier of the selected intra-prediction mode and an identifier of the location of the second group of image elements corresponding to the selected candidate prediction.

Another exemplary embodiment presents an encoding apparatus comprising a mode selection module, a weighting module, a first prediction module, a second prediction module, and an evaluation module. The mode selection module is configured to select an intra-prediction mode for a first group of image elements in a frame of a video sequence. The weighting module is configured to identify which subset of a plurality of subsets of intra-prediction modes contains the selected intra-prediction mode. Each subset corresponds to a first weighting and a second weighting calculated for all intra-prediction modes of that subset, and different first weightings and different second weightings are calculated for different subsets. The first prediction module is configured to estimate a first prediction of the first group of image elements using intra-prediction according to the selected intra-prediction mode, and to apply the first weighting assigned to the identified subset to the first prediction to generate a first weighted prediction. The second prediction module is configured to estimate a plurality of second weighted predictions by applying the second weighting for the identified subset to each of a second group of image elements previously encoded and proximate the first group of image elements. Each of the second group of image elements is located at a different location from the first group of image elements. The evaluation module is configured to determine a plurality of candidate predictions, where each candidate prediction comprises a combination of the first prediction and one of the plurality of second weighted predictions or a combination of the first weighed prediction and one of the second group of image elements. The evaluation module is further configured to select the candidate prediction having a better performance parameter than the other candidate predictions, and encode the first group of image elements as an identifier of the selected intra-prediction mode and an identifier of the location of the second group of image elements corresponding to the selected candidate prediction.

In some embodiments, the encoder or encoder apparatus is comprised in a device, including but not limited to, a tablet, personal computer, mobile telephone, set-top box, and camera.

DETAILED DESCRIPTION

Figure 1:
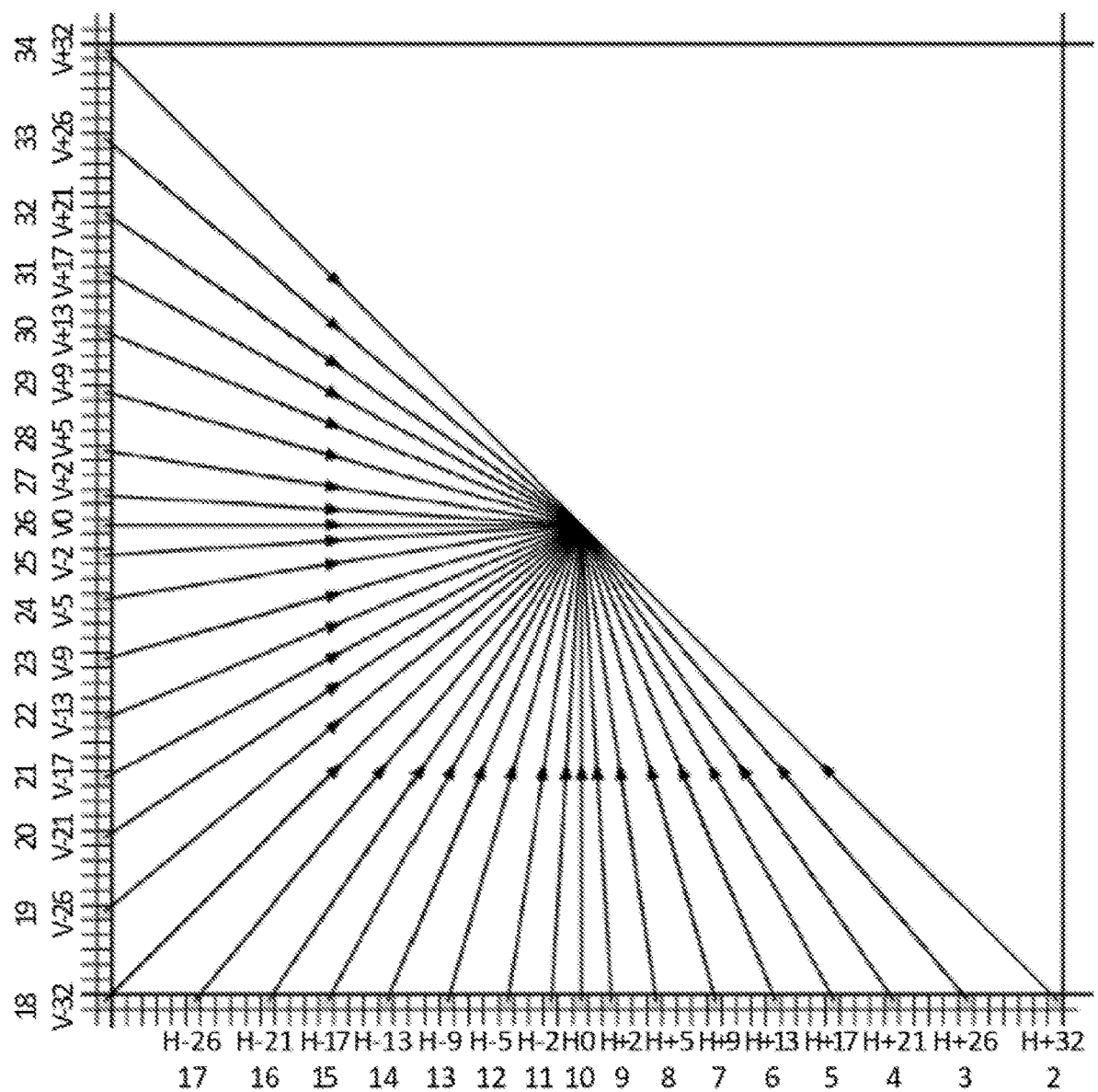
FIG. 1 shows an example of intra-prediction.

In the solution presented herein, a video sequence or bit stream comprises one or multiple, e.g., at least two, frames or pictures. Each frame is composed of a series of one or more slices, where such a slice includes one or more macroblocks of image elements. In the following discussions, the expression "image element" is used to denote the smallest element of a frame or picture in a video sequence. Such an image element has associated image element properties, e.g., color (in the red, green, blue, RGB, space) and/or luminance (Y) and chrominance (Cr, Cb or sometimes denoted U, V). A typical example of an image element is a pixel or a sample of a frame or picture.

The image elements are organized into groups of image elements. The expression "group of image elements" denotes any of the prior art known partitions of frames and slices into collections of image elements that are handled together during decoding and encoding. It will be appreciated that the expression "group of image elements" may be used interchangeably with "block." Generally, such a group is a rectangular (M×N) or square (M×M) group of image elements. In the art such a grouping is generally denoted as a macroblock in the video compression standard. An exemplary macroblock has a size of 16×16 image elements, and may comprise multiple so-called sub-macroblock partitions, e.g., partitions having 16×8, 8×16, 8×8, 8×4, 4×8 and 4×4 image elements. The 8×8 sub-macroblock partition is often denoted as a sub-macroblock or sub-block. In HEVC, the correspondence term to macroblock is Coding Tree Unit (CTU) and the size is 64×64. A CTU may be divided by a quadtree, which leaves are called Coding Units (CUs). The size of the CUs may be 64×64, 32×32, 16×16, 8×8, or 4×4. A CU may further be divided into Prediction Units (PUs) and Transform Units (TUs), where a PU corresponds to a prediction block and a TU corresponds to a residual block. In the following discussions, the expression "group of image elements" is used to denote any such macroblock, sub-macroblock or partition size, PU, or any other grouping of image elements used in video compression unless explicitly notified otherwise. A typical example could be that the luminance component of a PU comprises 64×64 image elements, and that the associated chrominance components are spatially sub-sampled by a factor of two in the horizontal and vertical directions to form 32×32 blocks.

The following describes decoding and encoding operations in terms of weighted combinations of first and second predictions. It will be appreciated that these combinations rely on either the first prediction being weighted, the second prediction being weighted, or both predictions being weighted before combining. Further, the expression "weighting" as used herein may refer to a matrix of weights, one for each image element of the corresponding prediction, where the size of the matrix of weights is the same as the size of the block being weighted. In other embodiments, the weighting is a constant (or a matrix of identical weights) such t that each image element is weighted by the same amount.

Figure 2:
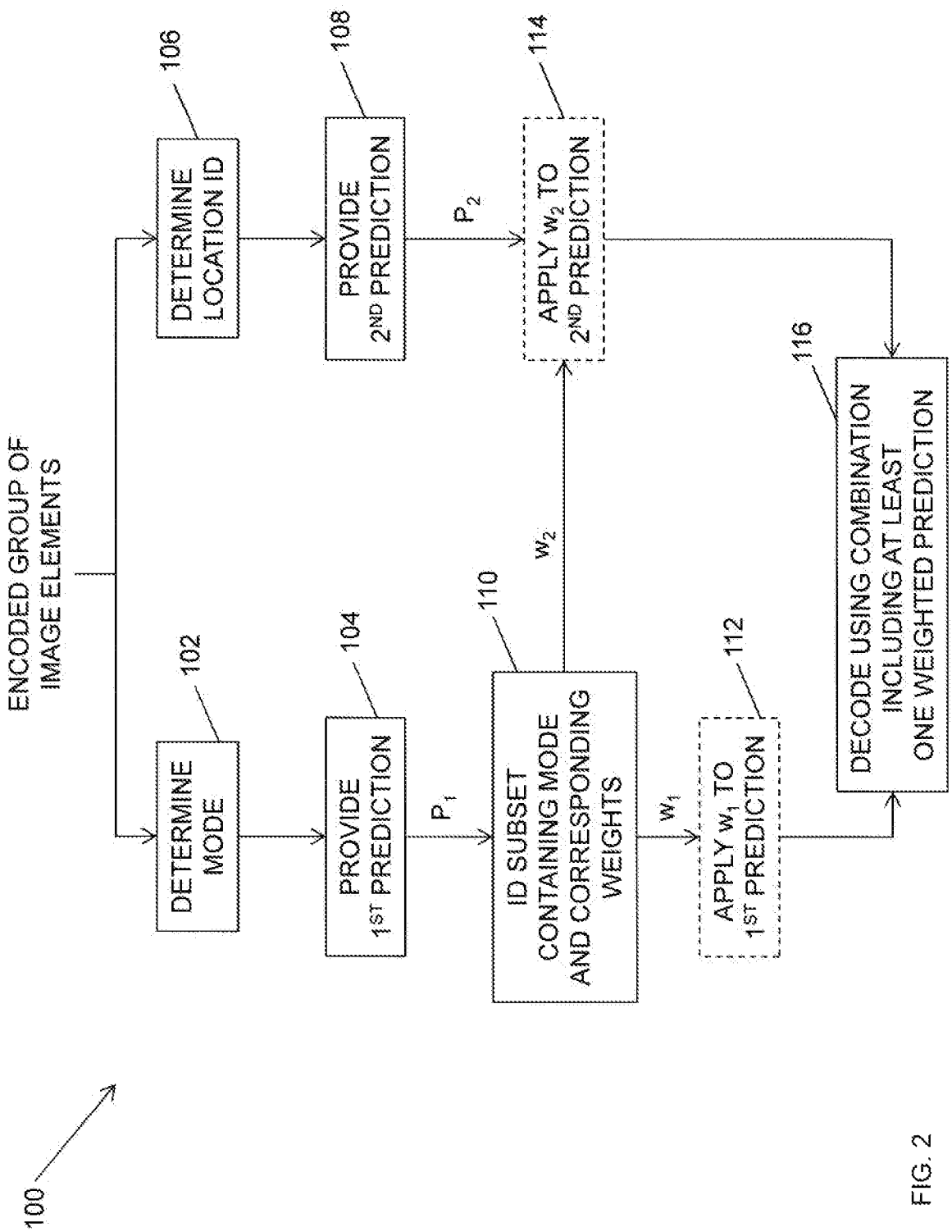
FIG. 2 shows a decoding method according to one exemplary embodiment.

FIG. 2 shows a flow diagram illustrating an exemplary method 100 of decoding a group of image elements using a decoder. To that end, the decoder determines an intra-prediction mode for the group of image elements (block 102) and provides a first prediction of the group of image elements according to the determined intra-prediction mode (block 104). The decoder also determines a location identifier identifying a location of a decoded version of another group of image elements in a frame of the video sequence (block 106), and provides a second prediction of the group of image elements using the determined location identifier (block 108).

The use of the combination of determining a location identifier identifying a location of a decoded version of another group of image elements in a frame of the video sequence and providing a second prediction of the group of image elements using the determined location identifier may be signaled with a flag from the encoder to the decoder. That implies that the encoder sends a flag and if the flag indicates that this combination is used, the decoder is configured to decode the location identifier, e.g., by state of art template matching or by template matching using at least some frequencies of the intra prediction as template or from the bitstream, and to provide a second prediction of the group of image elements using the determined location identifier. An alternative is to determine the location identifier on the encoder side which can improve the prediction but then the location identifier needs to be signaled which cause some overhead.

Typically template matching is used to denote that one uses samples outside the current block (samples that already have been decoded) as template for matching with other samples that already have been decoded. However as describe below, it is possible to use the intra prediction as a template to find the position of the second prediction block that best match with previously decoded samples. The benefit of that is that one use the current block for the matching and not samples outside the current block. In this case the template area is overlapping with the position of the current block but the intra predicted samples are used.

For example, the decoder may provide the second prediction of the group of image elements according to intra-block prediction or inter-block prediction. Referring to a plurality of subsets of intra-prediction modes, where each subset corresponds to a first weighting and a second weighting for all intra-prediction modes of that subset, and where different subsets are assigned different first weightings and different second weightings, the decoder identifies which subset contains the determined intra-prediction mode (block 110). The decoder then applies at the first weighting assigned to the identified subset to the first prediction to generate a first weighted prediction (block 112) and/or applies the second weighting assigned to the identified subset to the second prediction to generate a second weighted prediction (block 114). The decoder generates a decoded version of the group of image elements using a combination of the first prediction and the second weighted prediction or using a combination of the first weighted prediction and the second prediction (block 116). In some embodiments, the decoder generates the decoded version of the group of image elements using a combination of both the first weighted prediction and the second weighted prediction. A sum of the first weighting and the second weighting assigned to each subset may be a constant. It will be appreciated that when the combination relies on the unweighted first prediction, block 112 is optional. Similarly, it will be appreciated that when the combination relies on the unweighted second prediction, block 114 is optional.

Those skilled in the art will appreciate that the first weighting and the second weighting may each include a weight for each element of the group of image elements. In some embodiments, all of the weights may be the same. However, in other embodiments discussed in further detail below, at least some of the weights are different. For example, the weights for the image elements near the edge of neighboring group(s) of image elements may be greater than the weights for the image elements farther away from the edge of the neighboring group(s). Further, while in some embodiments the first weighting is greater than the second weighting, e.g., when the second prediction is provided according to inter-block prediction, in other embodiments the second weighting is greater than the first weighting, e.g., when decoded image elements used for the second prediction have been filtered. In still other embodiments, an additional weight scaling factor, e.g., received with the encoded video sequence, may be used to further adjust the first weighting and/or the second weighting. Such a weight scaling factor may have a value between 0 and a positive non-zero constant, e.g., 1, and is configured to emphasize the first/second weighting over the second/first weighting to further control an influence of the first/second prediction on the generated decoded version.

Furthermore, the determination of the location identifier may be based on template matching using the first prediction as template. According to a further embodiment, the first and second weighting is different for low frequency components and high frequency components of the first and second prediction.

Figure 3:
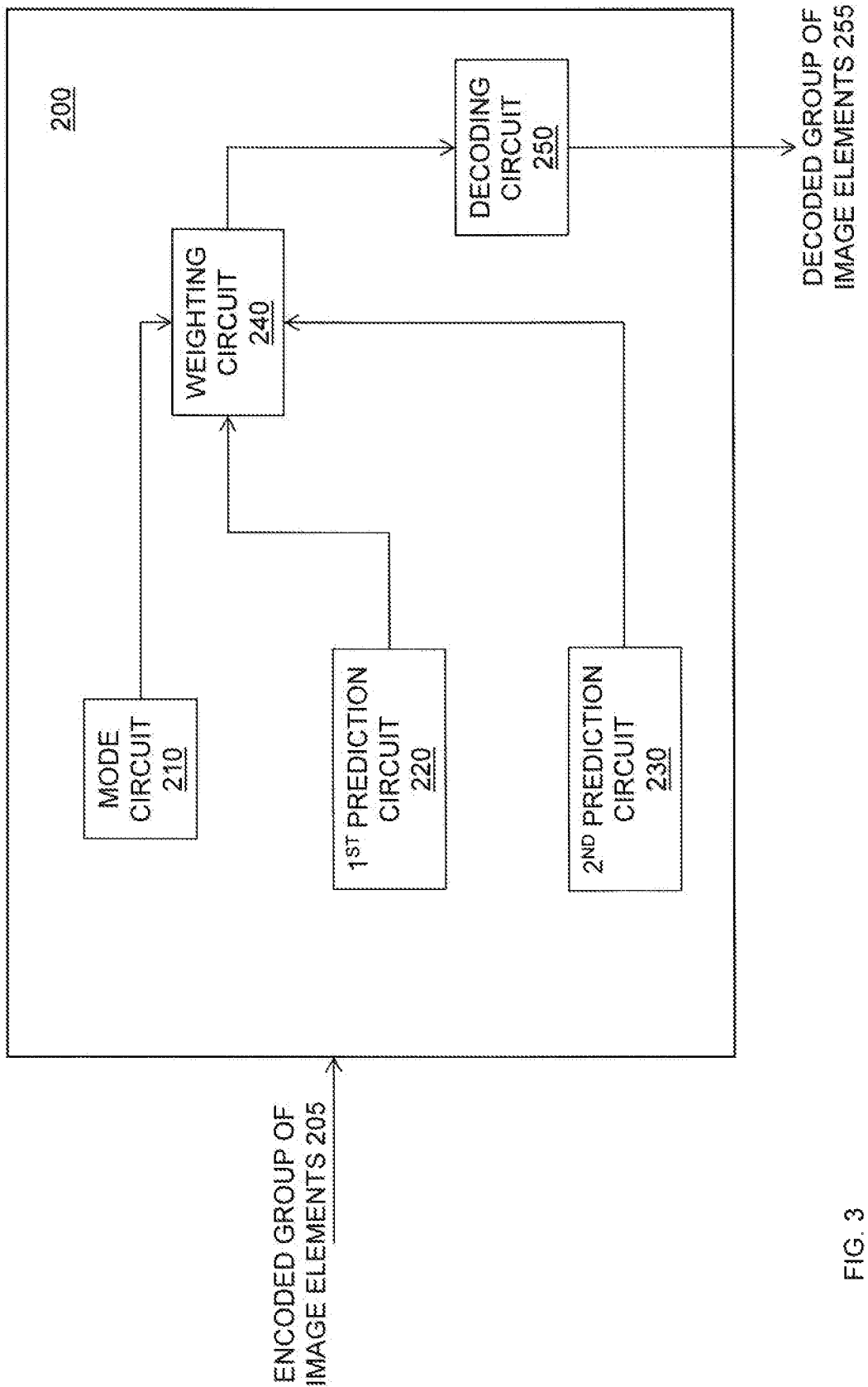
FIG. 3 shows a block diagram of a decoder according to one exemplary embodiment.

In some embodiments, decoder 200 in FIG. 3 may implement the method 100 of FIG. 2. In this embodiment, the decoder 200 comprises a mode circuit 210, first prediction circuit 220, second prediction circuit 230, weighting circuit 240, and decoding circuit 250. The mode circuit 210 determines an intra-prediction mode for a group of image elements 205 in a frame of a video sequence (e.g., block 102 of FIG. 2), and determines a location identifier identifying a location of a decoded version of another group of image elements in a frame of the video sequence (e.g., block 106 of FIG. 2). The first prediction circuit 220 provides a first prediction of the group of image elements using intra-prediction according to the determined intra-prediction mode (e.g., block 104 of FIG. 2), and the second prediction circuit 230 provides a second prediction of the group of image elements using the determined location identifier (e.g., block 108 of FIG. 2). The weighting circuit 240 identifies which subset of a plurality of subsets of intra-prediction modes contains the determined intra-prediction mode, where each subset corresponds to a first weighting and a second weighting assigned for all intra-prediction modes of that subset, and where different subsets are assigned different first weightings and different second weightings (e.g., block 110 of FIG. 2). The weighting circuit 240 also applies the first weighting assigned to the identified subset to the first prediction to generate a first weighted prediction (e.g., block 112 of FIG. 2) and/or applies the second weighting assigned to the identified subset to the second prediction to generate a second weighted prediction (e.g., block 114 of FIG. 2). The decoding circuit 250 generates a decoded version of the group of image elements 255 using a combination of the first prediction and the second weighted prediction or using a combination of the first weighted prediction and the second prediction (e.g., block 116 of FIG. 2).

Figure 4:
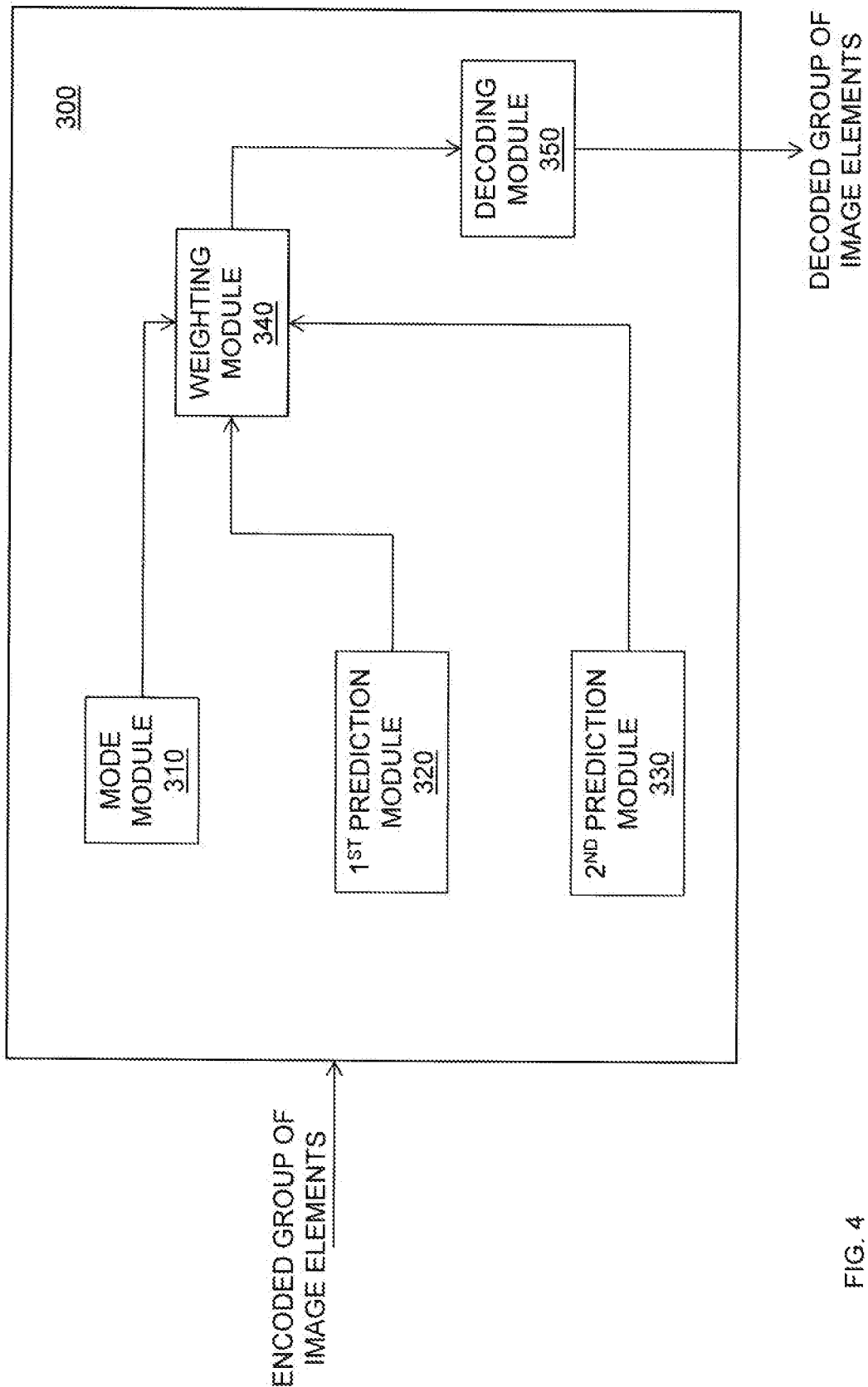
FIG. 4 shows a block diagram of a decoding apparatus according to one exemplary embodiment.

It will be appreciated that other devices may implement the method 100 of FIG. 2. For example, the decoding apparatus 300 shown in FIG. 4 may use the illustrated mode module 310, first prediction module 320, second prediction module 330, weighting module 340, and decoding module 350 to implement method 100. Those of skill in the art will also readily recognize that the method 100 described herein may be implemented as stored computer program instructions for execution by one or more computing devices, such as microprocessors, Digital Signal Processors (DSPs), FPGAs, ASICs, or other data processing circuits. The stored program instructions may be stored on machine-readable media, such as electrical, magnetic, or optical memory devices. The memory devices may include ROM and/or RAM modules, flash memory, hard disk drives, magnetic disc drives, optical disc drives and other storage media known in the art. For example, method 100 may be implemented using a decoding processor comprising software instructions that when run on the decoding processor cause the decoding processor to execute the method 100 of FIG. 2.

Figure 5:
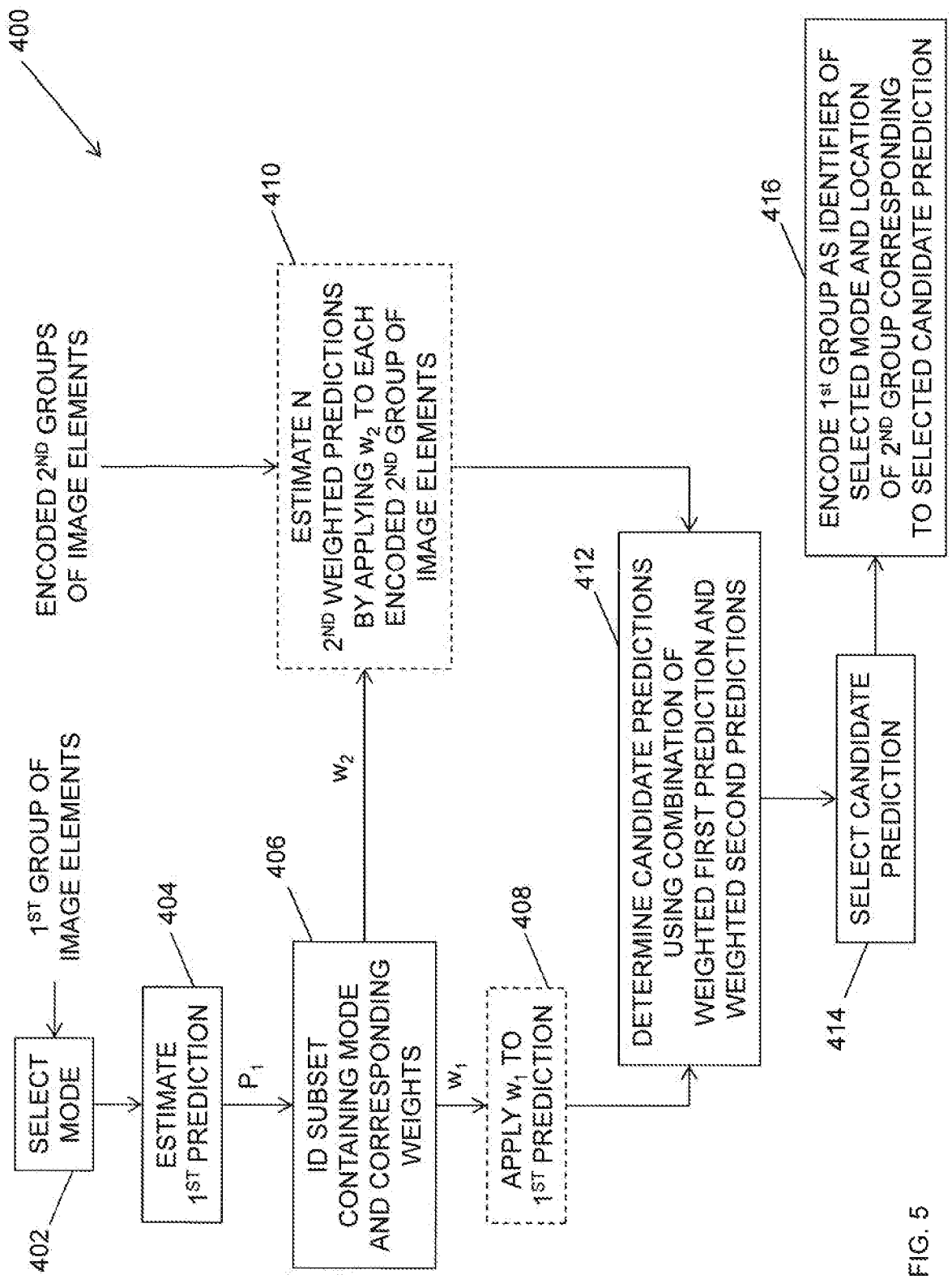
FIG. 5 shows an encoding method according to one exemplary embodiment.

FIG. 5 shows a flow diagram illustrating an exemplary method 400 of encoding a first group of image elements in a frame of a video sequence using an encoder. To that end, the encoder selects an intra-prediction mode for a first group of image elements (block 402). It further identifies which subset of a plurality of subsets of intra-prediction modes contains the selected intra-prediction mode, wherein each subset corresponds to a first weighting and a second weighting calculated for all intra-prediction modes of that subset, and wherein different first weightings and different second weightings are calculated for different subsets. Then a first prediction of the first group of image elements is estimated using intra-prediction according to the selected intra-prediction mode (block 404). Referring to a plurality of subsets of intra-prediction modes, where each subset corresponds to a first weighting and a second weighting calculated for all intra-prediction modes of that subset, and where different first weightings and different second weightings are calculated for different subsets, the encoder identifies which subset of the plurality of subsets of intra-prediction modes contains the selected intra-prediction mode (block 406). The encoder then applies the first weighting assigned to the identified subset to the first prediction to generate a first weighted prediction (block 408). The encoder also estimates a plurality of second weighted predictions from a plurality of encoded second group of image elements, where each of the second group of image elements is located at a different location from the first group of image elements. To that end, the encoder applies the second weighting for the identified subset to each of the second group of image elements previously encoded and proximate the first group of image elements (block 410). The encoder then determines a plurality of candidate predictions, where each candidate prediction comprises a combination of the first prediction and one of the plurality of second weighted predictions or a combination of the first weighted prediction and one of the second group of image elements (block 412). It will be appreciated that when the combination relies on the unweighted first prediction, block 408 is optional. Similarly, it will be appreciated that when the combination relies on the second group of image elements, block 410 is optional. In any event, the encoder selects the candidate prediction having a better performance parameter than the other candidate predictions (block 414), and encodes the first group of image elements as an identifier of the selected intra-prediction mode and an identifier of the location of the second group of image elements corresponding to the selected candidate prediction (block 416). According to one embodiment, a flag is encoded when at least some intra-prediction mode is used. The flag may indicate whether an identifier of the location of the second group of image elements corresponding to the selected candidate prediction is enabled. If the flag indicates, the identifier of the location of the second group of image elements may be decoded and/or assumed to be derived at the decoder by template matching.

As with the decoding embodiments, the first weighting and the second weighting each include a weight for each element of the corresponding group of image elements. In some embodiments, all of the weights may be the same. However, at least some of the weights are different. Further, while in some embodiments the first weighting is greater than the second weighting, in other embodiments the second weighting is greater than the first weighting. In still other embodiments, an additional weight scaling factor, e.g., which may be signaled with the encoded video sequence, may be used to further adjust the first weighting and/or the second weighting. Such a weight scaling factor may have a value between 0 and a positive non-zero constant, e.g., 1, and is configured to emphasize the first/second weighting over the second/first weighting to further control an influence of the first/second prediction on the combination.

Figure 6:
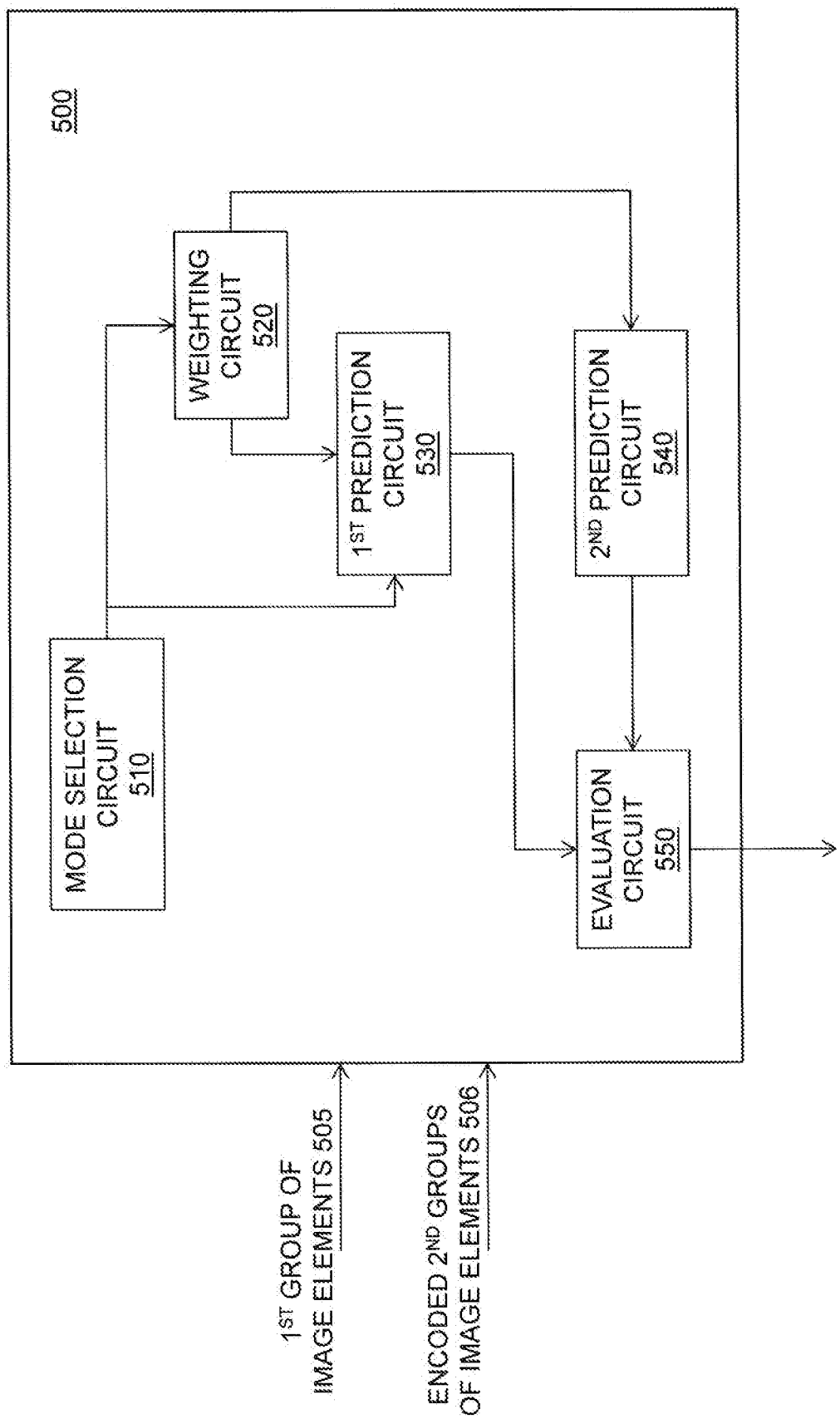
FIG. 6 shows a block diagram of an encoder according to one exemplary embodiment.

In some embodiments, encoder 500 in FIG. 6 may implement the method 400 of FIG. 5. In this embodiment, the encoder 500 comprises a mode selection circuit 510, weighting circuit 520, first prediction circuit 530, second prediction circuit 540, and an evaluation circuit 550. The mode selection circuit 510 selects an intra-prediction mode for a first group of image elements 505 in a frame of a video sequence (e.g., block 402 in FIG. 5). The weighting circuit 520 then identifies which subset of a plurality of subsets of intra-prediction modes contains the selected intra-prediction mode (e.g., block 406 in FIG. 5). The first prediction circuit 530 estimates a first prediction of the first group of image elements using intra-prediction according to the selected intra-prediction mode (e.g., block 404 in FIG. 5), and applies the first weighting assigned to the identified subset to the first prediction to generate a first weighted prediction (e.g., block 408 in FIG. 5). The second prediction circuit 540 estimates a plurality of second weighted predictions by applying the second weighting for the identified subset to each of a second group of image elements 506 previously encoded and proximate the first group of image elements (e.g., block 410 in FIG. 5). The evaluation circuit 550 then generates the encoded information 560. More particularly, the evaluation circuit 550 determines a plurality of candidate predictions, where each candidate prediction comprises a combination of the first prediction and one of the plurality of second weighted predictions or a combination of the first weighed prediction and one of the second group of image elements (e.g., block 412 in FIG. 5). The evaluation circuit

550 then selects the candidate prediction having a better performance parameter than the other candidate predictions (e.g., block 414 in FIG. 5), and encodes the first group of image elements 560 as an identifier of the selected intra-prediction mode and an identifier of the location of the second group of image elements corresponding to the selected candidate prediction (e.g., block 416 in FIG. 5).

Figure 7:
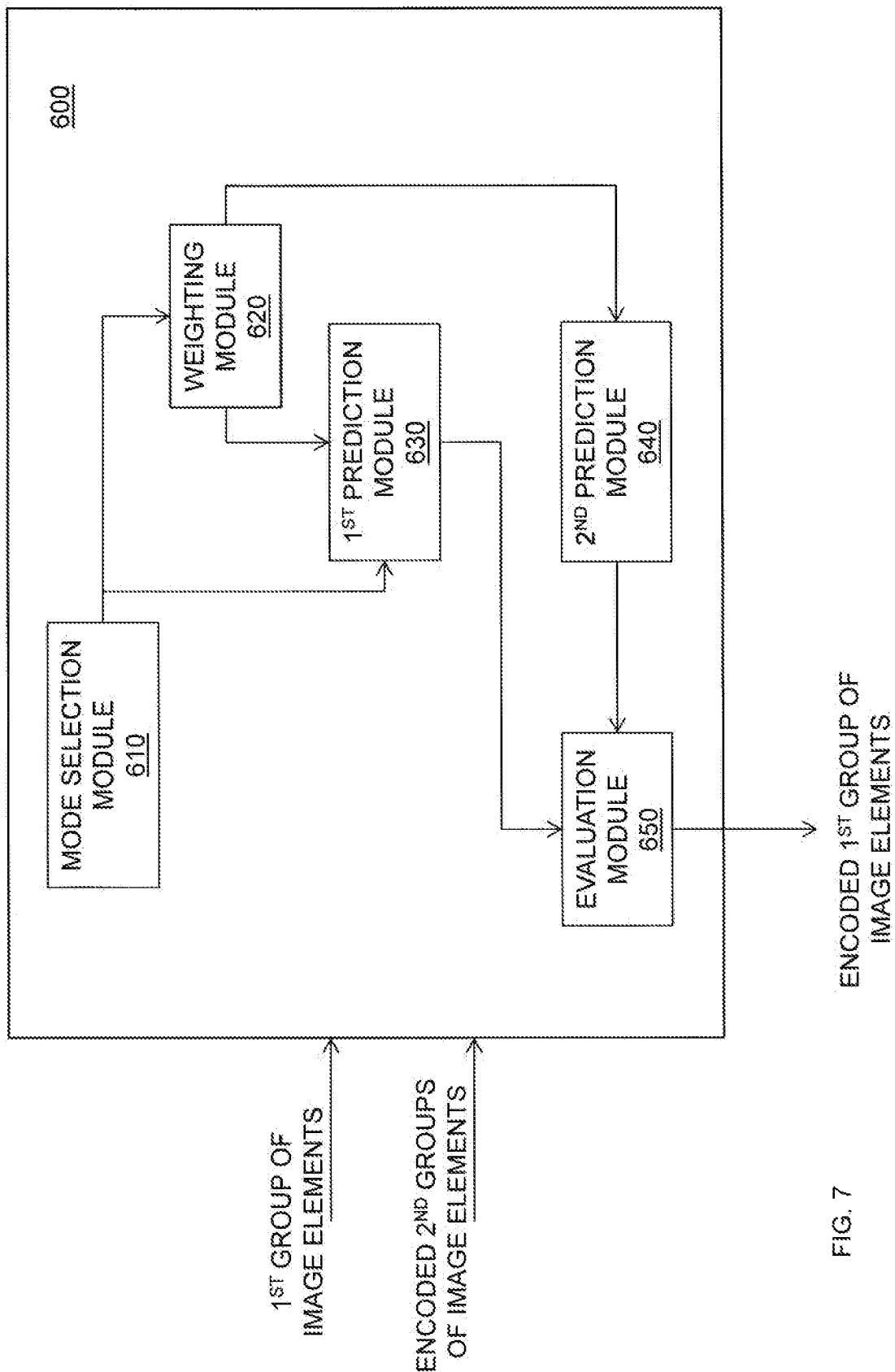
FIG. 7 shows a block diagram of an encoding apparatus according to one exemplary embodiment.

It will be appreciated that other devices may implement the method 400 of FIG. 5. For example, the encoding apparatus 600 shown in FIG. 7 may use the illustrated mode module selection 610, weighting module 620, first prediction module 630, second prediction module 640, and evaluation module 650 to implement method 400. Those of skill in the art will also readily recognize that the method 400 described herein may be implemented as stored computer program instructions for execution by one or more computing devices, such as microprocessors, Digital Signal Processors (DSPs), FPGAs, ASICs, or other data processing circuits. The stored program instructions may be stored on machine-readable media, such as electrical, magnetic, or optical memory devices. The memory devices may include ROM and/or RAM modules, flash memory, hard disk drives, magnetic disc drives, optical disc drives and other storage media known in the art. For example, method 400 may be implemented using an encoding processor comprising software instructions that when run on the encoding processor cause the encoding processor to execute the method 400 of FIG. 5.

Figure 8:
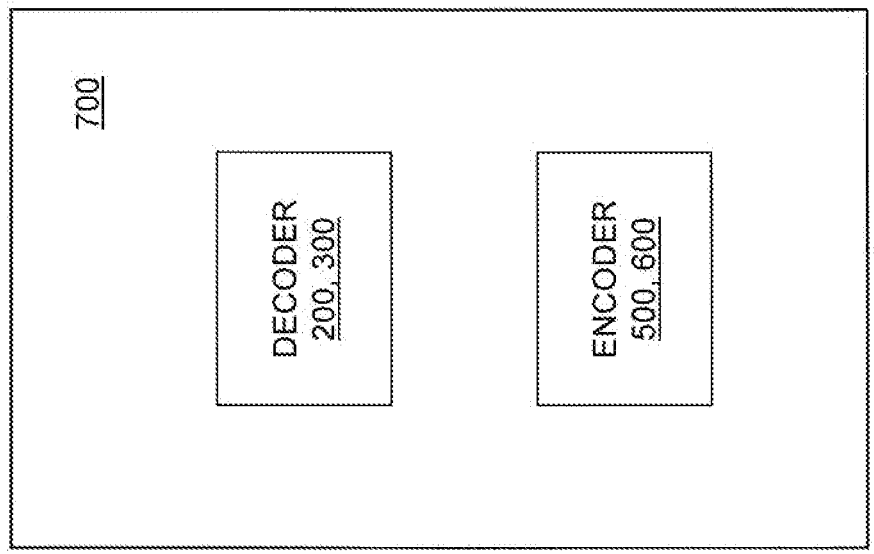
FIG. 8 shows a device according to one exemplary embodiment.

The encoder and/or decoder devices disclosed herein may be comprised in any device, including but not limited to a tablet, personal computer, mobile telephone, set-top box, camera, machine-to-machine device, etc. FIG. 8 shows one exemplary device 700. As used herein, the term "mobile terminal" may include a cellular radiotelephone with or without a multi-line display; a Personal Communication System (PCS) terminal that may combine a cellular radiotelephone with data processing, facsimile, and data communications capabilities; a Personal Digital Assistant (PDA) that can include a radiotelephone, pager, Internet/intranet access, web browser, organizer, calendar, and/or a global positioning system (GPS) receiver; and a conventional laptop and/or palmtop receiver or other appliance that includes a radiotelephone transceiver. Mobile terminals may also be referred to as "pervasive computing" devices.

The following summarizes various embodiments of the solution presented herein. Following these embodiment summaries is a second providing a more detailed explanation for each embodiment. It will be appreciated that Embodiment 1 provides the primary and most general embodiment, while all remaining embodiments stem from at least Embodiment 1.

Embodiment 1 describes the general concept of combining a first prediction (e.g., intra-prediction) with a second prediction (e.g., intra-block copy). The combination is performed as a weighted average of the two predictions where a weight is applied to at least one of the predictions, and where the weight is determined by the intra-prediction mode.

Embodiment 2 describes that the weighting includes a weight for each image element.

Embodiment 3 describes that the weighting is different for the case of a second prediction from the current frame than when the second prediction comes from another frame.

Embodiment 4 describes that the weighting depends on the Quantization Parameter used for the reference image elements of the first and second prediction.

Embodiment 5 describes that the weighting depends on if the second prediction is filtered or not.

Embodiment 6 describes that the method is enabled by a flag included with the encoded video sequence. The flag could also be present for some intra-prediction mode to reduce overhead for signaling the flag.

Embodiment 7 describes that the method enables combination with a second prediction using an additional weight scaling factor, e.g., a weight scaling factor between 0 and a positive non-zero constant. A weight scale factor of 0 would represent the case where only intra-prediction is used. A larger weight scale factor can control how much of the second prediction that shall be used to refine the first (intra) prediction.

Embodiment 8 describes a limitation of the use of the second prediction with respect to frequency.

Embodiment 9 describes specific weighting for different range of frequencies. So that low frequencies from the first and second prediction can be combined with a different weighting compared to how high frequencies from the first and second prediction are combined.

Embodiment 10 describes that the second prediction is derived by template matching.

Embodiment 11 describes that the search range of the template matching in embodiment 10 is restricted by the intra-prediction mode.

Embodiment 12 describes that the template matching in embodiment 10 or 11 is at least partially determined from predicted image elements of the intra-prediction.

Embodiment 13 describes that the template matching in embodiments 10, 11, or 12 is determined using an error metric that is scaled according to the weights used in the combination of the intra-prediction with the second prediction.

Embodiment 14 describes that the second prediction is determined by referencing previously decoded image elements as indicated from a displacement vector that has been decoded from the video sequence.

Embodiment 15 describes that the derivation of the displacement vector in embodiment 14 depends on the intra-prediction mode.

Embodiment 16 describes a limitation of the use of the second prediction with respect to frequency. Similar to embodiment 9 but in this case it could potentially be used without a weighting which then can make it different from Embodiment 1.

Embodiment 17 is similar to Embodiment 16 but here a limitation to the use of the intra-prediction with respect to frequency is also made.

Embodiment 18 describes that the second prediction is an inter-prediction.

Embodiment 19 describes that the method is used for at least one color component, for example luma.

Embodiment 20 describes a variant for chroma, which is partially different from how luma is derived.

Embodiment 21 describes that the method is used for sub-blocks of the current group of image elements using the same intra-prediction mode for all sub-blocks but refining each sub-block after prediction with a coded residual.

Figure 9:
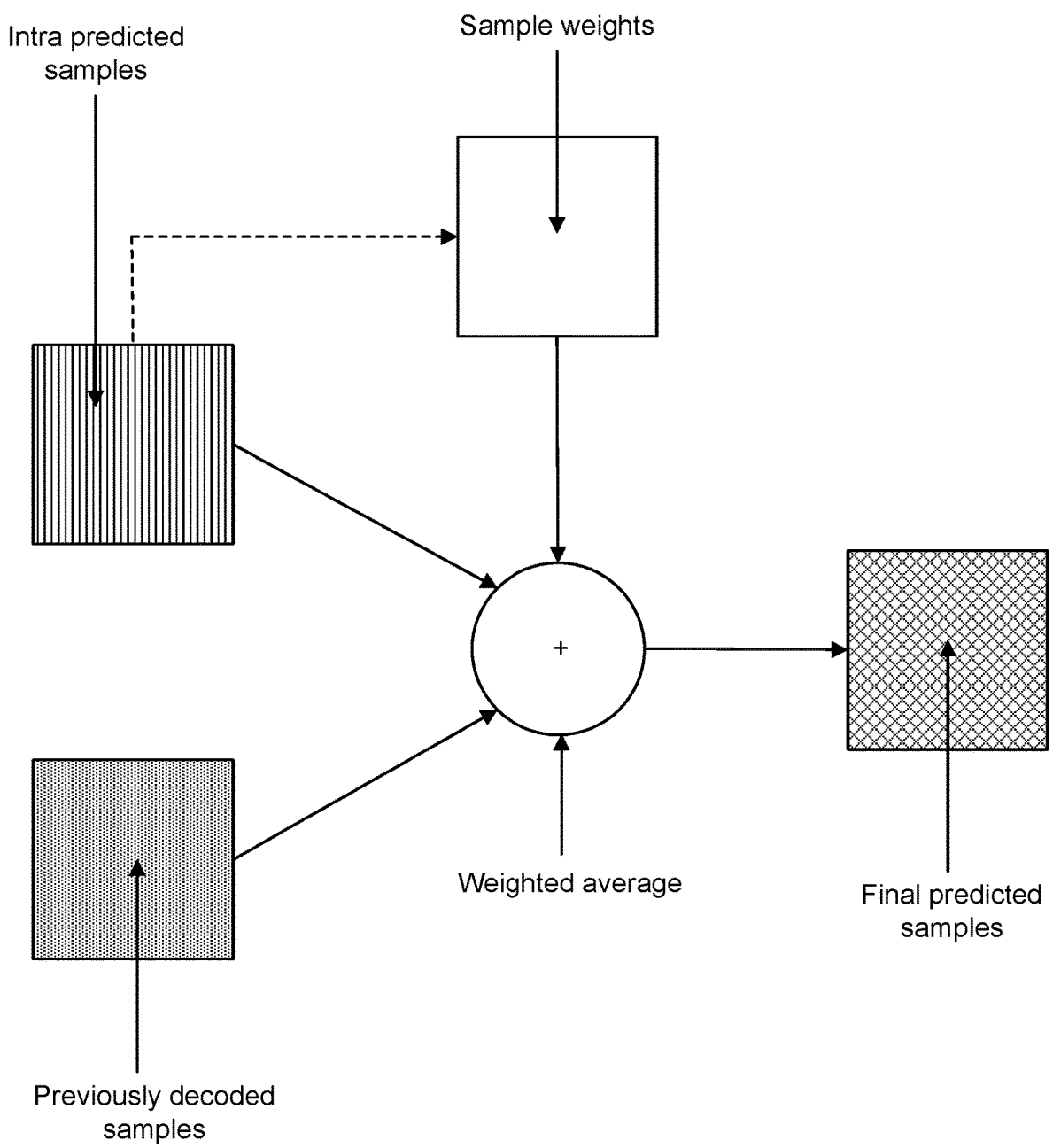
FIG. 9 shows an example of the solution presented herein based on the intra-prediction mode.

In Embodiment 1, an intra-prediction mode is determined for the current group of image elements to be decoded. See FIG. 9 for an example of this embodiment. When the mode is determined, a first prediction comprising a first set of predicted image elements is produced using intra-prediction, according to the determined intra-prediction mode, from neighboring decoded image elements of the current group of image elements. A second prediction comprising a second set of predicted image elements is determined, e.g., from a block of previously decoded image elements located in the same picture as the current block using a location determined for the previously decoded image elements. A final prediction is then produced by a weighted combination of the first and the second set of predicted image elements, where the weighting is based on the intra-prediction mode, e.g., where the weighting is based on the subset of the intra-prediction modes containing the determined intra-prediction mode, and where the first prediction and/or the second prediction are weighted.

In Embodiment 2, which builds from Embodiment 1, when a horizontal intra-prediction mode is determined, image elements from the first prediction that are located close to the left edge of the current group of image elements will receive higher weights than corresponding image elements from the second set of predicted image elements. Similarly, image elements from the first prediction that are located close to the right edge of the current group of image elements will receive lower weights than the corresponding image elements from the second prediction.

When a vertical intra-prediction mode is determined (still Embodiment 2), image elements from the first prediction that are located close to the top edge of the current group of image elements will receive higher weights than corresponding image elements from the second prediction. Similarly, image elements from the first prediction that are located close to the bottom edge of the current group of image elements will receive lower weights than the corresponding image elements from the second prediction.

In one embodiment, the weighting can be specific for each intra-prediction mode. In another embodiment, the same weighting can be used for several intra-prediction modes, e.g., modes close to vertical prediction can use the vertical weighting, while modes close to horizontal prediction can use the horizontal weighting. In another embodiment, the weighting can be determined from a function, e.g., a polynomial that has different predefined coefficients pending on the intra-prediction mode and the block size. In another embodiment, the weighting can simply be tabulated for each intra-prediction mode and each block size. In yet another embodiment, the weights can be tabulated for a small block size for each intra-prediction mode, and then linearly interpolated for the other block sizes. In still other embodiments, combinations of each of these weighting embodiments may be used.

In Embodiment 3, which builds from previous embodiments, the weighting is determined from the distance between the current frame and the reference frame of the second prediction. For example, the weighting is set one way if the current and the reference frame used for the second prediction comes from the same time instant, and the weighting is set another way if the current and the reference frame used for the second prediction come from different time instants. One example is that a second prediction that corresponds to an inter-prediction has other weights than a second prediction that comes from the current frame. Typically, a second prediction from an inter-prediction has higher weights than a second prediction from the current frame. Then, for the case of a second prediction for different inter-predictions, the weighting for reference image elements that are further away from the current frame is typically lower than used for reference image elements that come from a reference frame closer to the current frame.

In Embodiment 4, which builds from previous embodiments, the weighting is determined from the Quantization Parameter (QP) used for the reference image elements of the first prediction and the QP used for the reference image elements of the second prediction. For example, if the QP for the reference image elements of the first prediction is larger (coarser quantization) than the QP used for the reference image elements of the second prediction, the weighting is typically larger for the reference image elements of the second prediction than when the QPs are the same or smaller. However, the first and second weighting may depend on the quantization parameters used for decoded image elements for the second and first prediction. Or perhaps, the second weighting is relatively higher when the Quantization parameter for decoded image elements used for the second prediction is lower (finer quantization) than the Quantization parameter of decoded image elements used for the first prediction than otherwise.

A simplification of this is to only refer to the QP for the reference image elements of the first prediction (for example the QP for the block to the left) and the slice QP used for the reference image elements of the second prediction. In this way, predicted image elements with potentially higher quality (lower QP) can get greater emphasis (a higher weighting) in the combination.

In Embodiment 5, which builds from previous embodiments, the weighting depends on if the second prediction has been filtered or not. If the second prediction has been interpolated, it likely contains less high frequencies than when it has not been interpolated. Thus, a larger weighting can be given for the second prediction when it not has been filtered/interpolated. A variation to this is to use higher weightings for the first prediction when the second prediction has been interpolated to enhance the loss of frequencies by the filtering/interpolation.

Embodiment 6, which builds from previous embodiments, adds an enable combination flag to determine if the weighted combination method should be used. For example, when the enable combination flag is 0, the intra-prediction is performed without combining it with a second prediction, and when the enable combination flag is 1, the intra-prediction is combined with the second prediction (one or both of which may be weighted). The enable combination flag may be signaled at various levels, e.g., sequence, picture, slice, block level, etc. The enable combination flag may be coded by any entropy coding method. On the block level, the enable combination flag may be such that it's only invoked on blocks larger than a certain size. If the flag is disabled at a higher level, the flag is not decoded at a lower level.

Embodiment 7, which builds from previous embodiments, adds a weight scaling factor. The weight scaling factor can be signaled at various levels such as sequence, picture, slice, certain block sizes, block level. It can be coded by any entropy coding method (CABAC etc). When the weight scaling factor is signaled it modifies the weighting so that the predicted image elements can be derived as:

$$P(x,y)=(1-w \cdot SF)S_1(x,y)+w \cdot SF \cdot S_2(x,y) \quad (2)$$

where w represents a weight between 0 and 1, $S_1$ represents the first prediction, $S_2$ represents the second prediction, (x, y) represent the spatial coordinates of a position in the predicted block, and SF represents the weight scaling factor.

In case the weighting is specific for each image element, the weight scaling factor can be used as follows:

$$P(x,y)=(1-w(x,y) \cdot SF)S_1(x,y)+w(x,y) \cdot SF \cdot S_2(x,y) \quad (3)$$

where w represents a weight between 0 and 1, $S_1$ represents the first prediction, $S_2$ represents the second prediction, (x, y) represent the spatial coordinates of a position in the predicted block, and SF represents the weight scaling factor.

Typically the weight scaling factor will have a range of a few values for example 0, 0.25, 0.5, 1.0. When the weight scaling factor is 0 the prediction will completely come from the first set, increasing weight will increase the influence of the second set. Typically the weight scaling factor and the weighting will be used in fixed point and not in floating point as described here. For example multiplication of X with 0.25 can be implemented as in the state of art practices, (X*8+ 16)□ 5, where □ corresponds to right shift by 5 (1/2^5), the weight 0.25 is thus represented by 8/32=0.25 and 16 is a rounding offset.

In Embodiment 8, which builds from previous embodiments, the final set of predicted image elements (decoded group of image elements) is produced by first removing the low frequency variations of the second prediction before combining the remaining high frequency variations of the second prediction with the first prediction to form a modified second prediction. After the combination, clipping is used to ensure that each image element is within the range of valid image elements. Then, the weighting of the first and second predictions is used as previously discussed. After the weighted image elements are created, image elements that are either below zero or above a maximum value as determined by bit-depth are clipped to ensure that each image element is within the range of valid image elements. Then, these image elements are combined to produce the final predicted image elements for the current block.

One example of how to determine the low frequency portion is to determine the average value of image elements. Another example of deriving a low frequency portion is to low-pass filter predicted image elements. A final predicted image element can be obtained using the average value as:

$$P(x,y)=(1-w(x,y))S_1(x,y)w(x,y)(S_1(x,y)+(S_2(x,y)-avg(S_2))) \quad (4)$$

where $S_1$ represents the first prediction, $S_2$ represents the second prediction, $avg(S_2)$ represents the average value of $S_2$, (x, y) represent the spatial coordinates of a position in the predicted block where x is horizontal and y is vertical, and w(x, y) represents the weight for position (x, y). It can be noted that although weighting in this document typically is described in with floating point operations, the weighting can be implemented in fixed point as:

$$P(x,y)=((1\square S)-w(x,y))S_1(x,y)+w(x,y)(S_1(x,y)+(S_2(x,y)-avg(S_2)))+(1\square(S-1))\square S \quad (5)$$

where S represents a scaling factor and (1□ S) represents a left shift of the scaling factor producing 2^(S). Fixed point implementation is the typical way to implement any weighting for the solution presented herein, but it is not the only way to implement the described weighting. The fixed point implementation is only described here for simplicity.

In a variant of this embodiment, the modified second prediction is derived from the low frequency variations of the first prediction. Also, here the low frequency variations are described by the average value. This can then be described as:

$$P(x,y)=(1-w(x,y))S_1(x,y)+w(x,y)(avg(S_1)+(S_2(x,y)-avg(S_2))) \quad (6)$$

where $S_1$ represents the first prediction, $S_2$ represents the second prediction, $avg(S_1)$ represents the average value of $S_1$, $avg(S_2)$ represents the average value of $S_2$, (x, y) represent the spatial coordinates of a position in the predicted block where x is horizontal and y is vertical, and w(x, y) represents the weight for position (x, y).

In Embodiment 9, which builds from previous embodiments, a different weighting is applied for low frequency and high frequency portions of the first and second predictions. In one example, the low frequency portion is determined by an average of the predicted image elements. In that case the high frequency portion corresponds to a prediction where the average has been removed. In another example, the low frequency portion is derived by low-pass filtering the predicted image elements. In this case the high frequency portion corresponds to a prediction where the low-pass filtered image elements have been removed. The reason for having different weights for low and high frequencies is that the intra-prediction can have a higher degree of uncertainty for high frequencies than for low frequencies further away from the reference image elements. One example to derive a predicted image element with individual weighting can be derived as:

$$P(x,y)=(1-w_l(x,y))S_{1,l}(x,y)+w_l(x,y)S_{2,l}(x,y)+(1-w_h(x,y))S_{1,h}(x,y)+w_h(x,y)S_{2,h}(x,y) \quad (7)$$

where $w_l(x, y)$ represents a weight for low frequencies and $w_h(x, y)$ represents a weight for high frequencies, where $S_1(x, y)$ represents the first prediction, $S_2(x, y)$ represents the second prediction, $S_{X,l}(x, y)$ represents the low frequency portion of the predicted image elements for prediction X, $S_{X,h}(x, y)$ represents the high frequency portion of predicted image elements for prediction X, and (x, y) represent the spatial coordinates of a position in the predicted block.

Another variant of this embodiment is to not have the weighting be image element specific, but rather to have the same low frequency weight for all low frequency portions of the predicted block, and respectively, the same high frequency weight for all high frequency image portions of the predicted block as:

$$P(x,y)=(1-w_l)S_{1,l}(x,y)+w_lS_{2,l}(x,y)+(1-w_h)S_{1,h}(x,y)+w_hS_{2,h}(x,y) \quad (8)$$

where $w_l$ represents a weight for low frequencies and $w_h$ represents a weight for high frequencies, and where $S_1(x, y)$ represents the first prediction, $S_2(x, y)$ represents the second prediction, $S_{X,l}(x, y)$ represents the low frequency portion of the predicted image elements for prediction X, $S_{X,h}(x, y)$ represents the high frequency portion of predicted image elements for prediction X, and (x, y) represent the spatial coordinates of a position in the predicted block.

Figure 10:
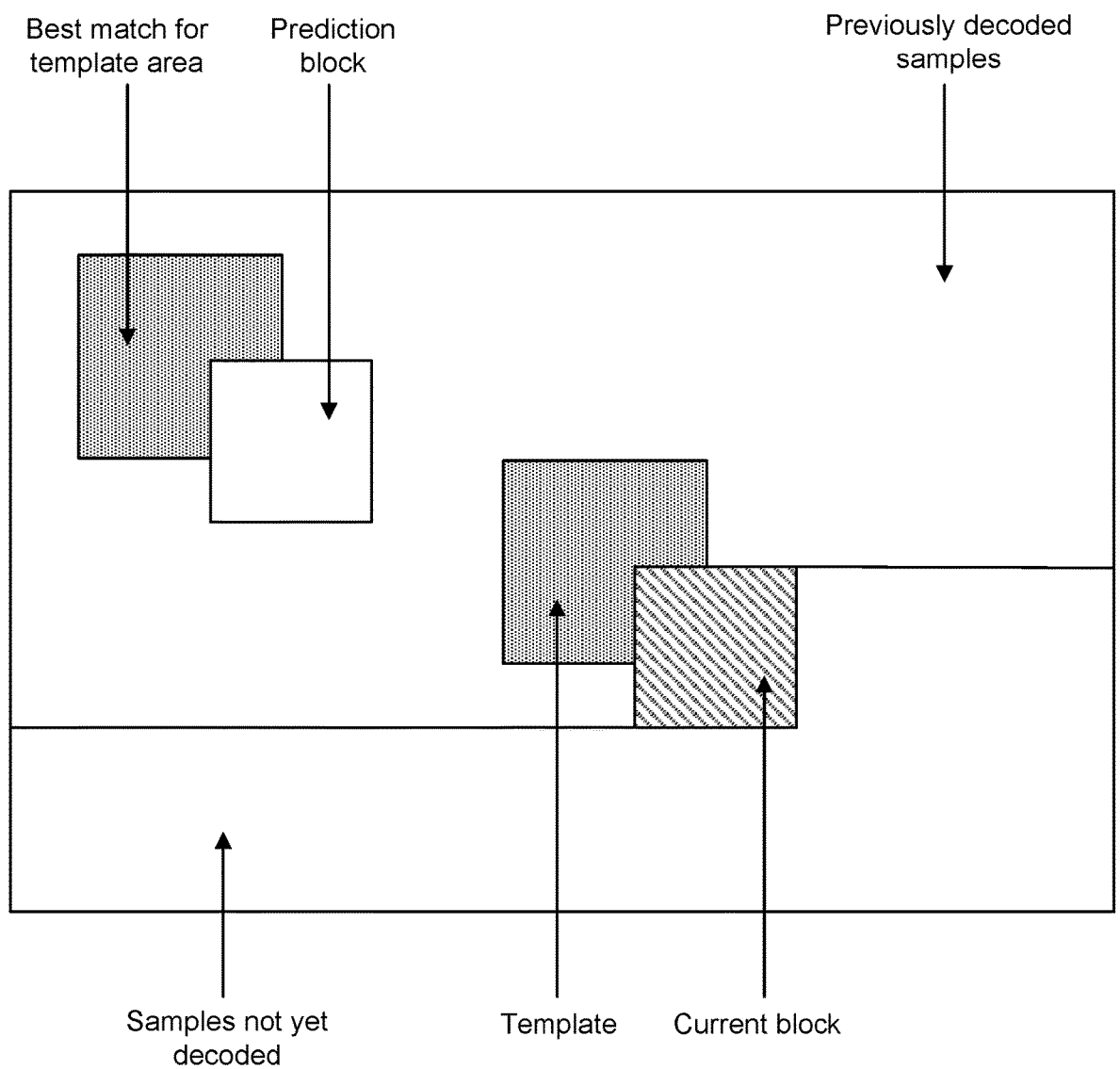
FIG. 10 shows an example of the solution presented herein based on template matching.

In Embodiment 10, which builds from previous embodiments, the second prediction is produced using template matching. See FIG. 10 for an example of this embodiment. Image elements that are located in the direct neighborhood of the current block are used for finding a location among all or a subset of previously decoded image elements in the current picture. The predicted image elements are then determined by finding the location that minimizes some error metric between the image elements at that location and the neighboring image elements of the current block. One example of error metric is the Sum of Absolute Difference (SAD), while another example is the Sum of Squared Differences (SSD). The metric to be used need to be same for both the encoder and the decoder. Further, the location may also be further refined by signaling a candidate index of the n best matches or by a signaling a displacement vector.

In Embodiment 11, which builds from Embodiment 10, the search range is restricted based on the direction of the intra-prediction mode of the current block. As an example, when a horizontal intra-prediction mode has been determined, previously decoded image elements that are located directly above the current block are not considered in the search.

In Embodiment 12, which builds from previous embodiments, the second prediction is determined from a set of candidates by considering one or several image elements produced by the first prediction of the current block. For each possible candidate of the predicted image elements of the second prediction, an error metric is calculated between one or several predicted image elements of the first prediction and the corresponding image elements of the second prediction candidate. A candidate is selected based on at least partially using the error metric. One example of an error metric is the Sum of Absolute Difference (SAD), while another example is the Sum of Squared Differences (SSD). The metric to be used needs to be same for both the encoder and the decoder. In one example the first prediction is used as a template to at least partly determine the location of the samples to use for the second prediction (some part of the location could be signaled and only some tuning of the location by template matching).

Below are some example code where the location for the second prediction completely is determined by searching in a neighbourhood of previously reconstructed samples around the current block. In this example no location information needs to be signaled to the decoder and the decoder performs same steps to derive the combined prediction. The combined prediction has in this example the DC (average value) from the first prediction added to a weighted average of the high frequency components from the first and second prediction. The weighting has a higher weight for the first prediction (intra prediction) closer to the reference samples of the intra prediction. The high frequency components are derived by removing the DC first prediction (the average value of first prediction) from the first prediction and the DC second prediction (the average value of the second prediction) from the second prediction.

```
// 1. Find a block that best matches piPred (the intra prediction block) by searching
among previously reconstructed samples to the left or above the current block
// first find sample position of top left coordinate of the current block,
// then find out how much can be searched to the left and above of the current block,
// in this example three times the width of the current block and three times the height of the
current block is searched
    Pel *lumaRec = pcPredYuv->getAddr( compID, uiAbsPartIdx );
    Int maxLeft = pcCU->getCUPelX( );
    Int search LeftX = min((Int)uiWidth*3,maxLeft);
    Int searchLeftToX = searchLeftX - min((Int)uiWidth,maxLeft);
    Int searchLeftY = 0;
    Pel *lumaLeft = lumaRec-searchLeftX;
    Int maxAbove = pcCU->getCUPelY( );
    Int searchAboveX = min((Int)uiWidth*3,maxLeft);
    Int searchAboveY = min((Int)uiHeight*3,maxAbove);
    const TComSPS* pSPS = pcCU->getSlice( )->getSPS( );
    Int maxRight = pSPS->getPicWidthInLumaSamples( ) - pcCU->getCUPelX( );
    Int searchAboveToX = searchAboveX + min((Int)uiWidth*4,maxRight);
    Int searchAboveToY = searchAboveY - min((int)uiHeight,maxAbove);
    Pel *lumaAbove = lumaRec-searchAboveX-searchAboveY*uiStride;
    Double bestMatch = uiWidth*uiHeight*1023*1023;
    Int bestPosX = 0; // 0 corresponds to the X position of current block
    Int bestPosY = 0; // 0 corresponds to the Y position of current block
    Int bestPredDC = 0;
    Int bestBlockCopyDC = 0;
    // search in region to the left
    Pel* blockCopyLeft = lumaLeft;
    for( UInt uiY2 = 0; uiY2 < (searchLeftY+1); uiY2++ )
    {
      for( UInt u iX2 = 0; uiX2 < searchLeftToX; uiX2++ )
      {
        Double theMatch = 0;
        Double predDC = 0.0;
        Double blockCopyDC = 0.0;
        Pel* pPred = piPred;
        Pel* blockCopy = blockCopyLeft+uiX2;
        for( UInt uiY = 0; uiY < uiHeight; uiY++ )
        {
          for( UInt uiX = 0; uiX < uiWidth; uiX++ )
          {
            Int diff = pPred[ uiX ]-blockCopy[uiX];
            predDC += pPred[ uiX ];
            blockCopyDC += blockCopy[ uiX ];
            theMatch += diff*diff;
          }
          pPred += uiStride; blockCopy +=uiStride;
        }
        // remove difference based on difference in DC (average value)
        Double DCPred = predDC/(Double)(uiHeight*uiWidth);
        Double DCBlockCopy = blockCopyDC/(Double)(uiHeigh*uiWidth);
        Double DCerr = DCPred-DCBlockCopy;
        DCerr = DCerr*DCerr;
        // remaining is AC error
        theMatch -= (Double)(uiHeigh*uiWidth)*DCerr;
        if(theMatch < bestMatch)
        {
          bestMatch = theMatch;
          bestPosX = (Int)uiX2;
          bestPosY = (Int)uiY2;
```

```
      bestPredDC = Int(DCPred+0.5);
      bestBlockCopyDC = Int(DCBlockCopy+0.5);
     }
   }
   blockCopyLeft += uiStride;
  }
  bool bestMatchAbove = false;
  // search in region above
  Pel* blockCopyAbove = lumaAbove;
  for( UInt uiY2 = 0; uiY2 < searchAboveToY; uiY2++ )
  {
    for( UInt uiX2 = 0; uiX2 < searchAboveToX; uiX2++ )
    {
     Double theMatch = 0;
     Double predDC = 0.0;
     Double blockCopyDC = 0.0;
     Pel* pPred = piPred;
     Pel* blockCopy = blockCopyAbove+uiX2;
     for( UInt uiY = 0; uiY < uiHeight; uiY++ )
     {
       for( UInt uiX = 0; uiX < uiWidth; uiX++ )
       {
        Int diff = pPred[ uiX ]-blockCopy[uiX];
        predDC += pPred[ uiX ];
        blockCopyDC += blockCopy[ uiX ];
        theMatch += diff*diff;
       }
       pPred += uiStride; blockCopy +=uiStride;
     }
     // remove difference based on difference in DC (average value)
     Double DCPred = predDC/(Double)(uiHeigh*uiWidth);
     Double DCBlockCopy = blockCopyDC/(Double)(uiHeigh*uiWidth);
     Double DCerr = DCPred-DCBlockCopy;
     DCerr = DCerr*DCerr;
     // remaining is AC error
     theMatch -= (Double)(uiHeight*uiWidth)*DCerr;
     if(theMatch < bestMatch)
     {
       bestMatch = theMatch;
       bestPosX = (Int)uiX2;
       bestPosY = (Int)uiY2;
       bestMatchAbove = true;
       bestPredDC = Int(DCPred+0.5);
       bestBlockCopyDC = Int(DCBlockCopy+0.5);
     }
    }
   blockCopyAbove += uiStride;
  }
  validPos = false;
  if(bestMatch < uiWidth*uiHeight*1023*1023)
  {
    validPos = true;
  }
  if(validPos)
  {
   // now derive the combined prediction as the DC part (low frequency part, variable
bestPredDC) of the intra prediction block and an pixel average of the high frequency intra
prediction block (intra prediction − bestPredDC) and the high frequency block copy prediction
block (block copy prediction − bestBlockCopyDC (average value of block copy prediction)),
where the weight (wMat) is determined from a subset of the (decoded) intra-prediction mode
and where the weight for the intra prediction block samples is larger closer to its reference
samples,
    Pel* pPred = piPred;
    Pel* blockCopy;
    Int bestPosCurrBlockX;
    Int bestPosCurrBlockY;
    if(bestMatchAbove)
    {
     bestPosCurrBlockX = −(searchAboveX−bestPosX);
     bestPosCurrBlockY = −(searchAboveY−bestPosY);
     blockCopyLeft = lumaAbove;
     blockCopy = blockCopyLeft+bestPosX+bestPosY*uiStride;
    }
    else
    {
     bestPosCurrBlockX = −(searchLeftX−bestPosX);
     bestPosCurrBlockY = 0;
     blockCopyLeft = lumaLeft;
     blockCopy = blockCopyLeft+bestPosX+bestPosY*uiStride;
```

```
        }
    Double theMatch = 0;
    for( UInt uiY = 0; uiY < uiHeight; uiY++ )
    {
      for( UInt uiX = 0; uiX < uiWidth; uiX++ )
      {
        Int combinedPrediction = bestPredDC + (((pPred[uiX]-bestPredDC)*WMat[uiY]
[uiX]+(blockCopy[uiX]-bestBlockCopyDC)*(maxweight-wMat[uiY] [uiX]) + theRound) >>
theShift); // divide by 8
        pPred[uiX] = combinedPrediction;
      }
      pPred += uiStride; blockCopy +=uiStride;
    }
  }
    }
```

The error metric may also be combined with another metric. A final metric is calculated by a weighted combination of both metrics. Examples of methods to weight both metrics are equal weights (e.g., an average), weights determined by number of image elements used for calculating the first metric and second metric, weights that have been determined before starting to decode the current block (e.g., signaled in bit stream), or a combination of these.

In Embodiment 13, which builds from Embodiments 10-12, the location used for producing the second prediction is determined by considering both the image elements in the first prediction and the method used for combining the two predictions. When calculating the second error metric between the image elements of the first prediction and the image elements at the search location, the error for each individual image element is weighted using the same weights that will later be used when combing that image element for creating the final prediction.

Figure 11:
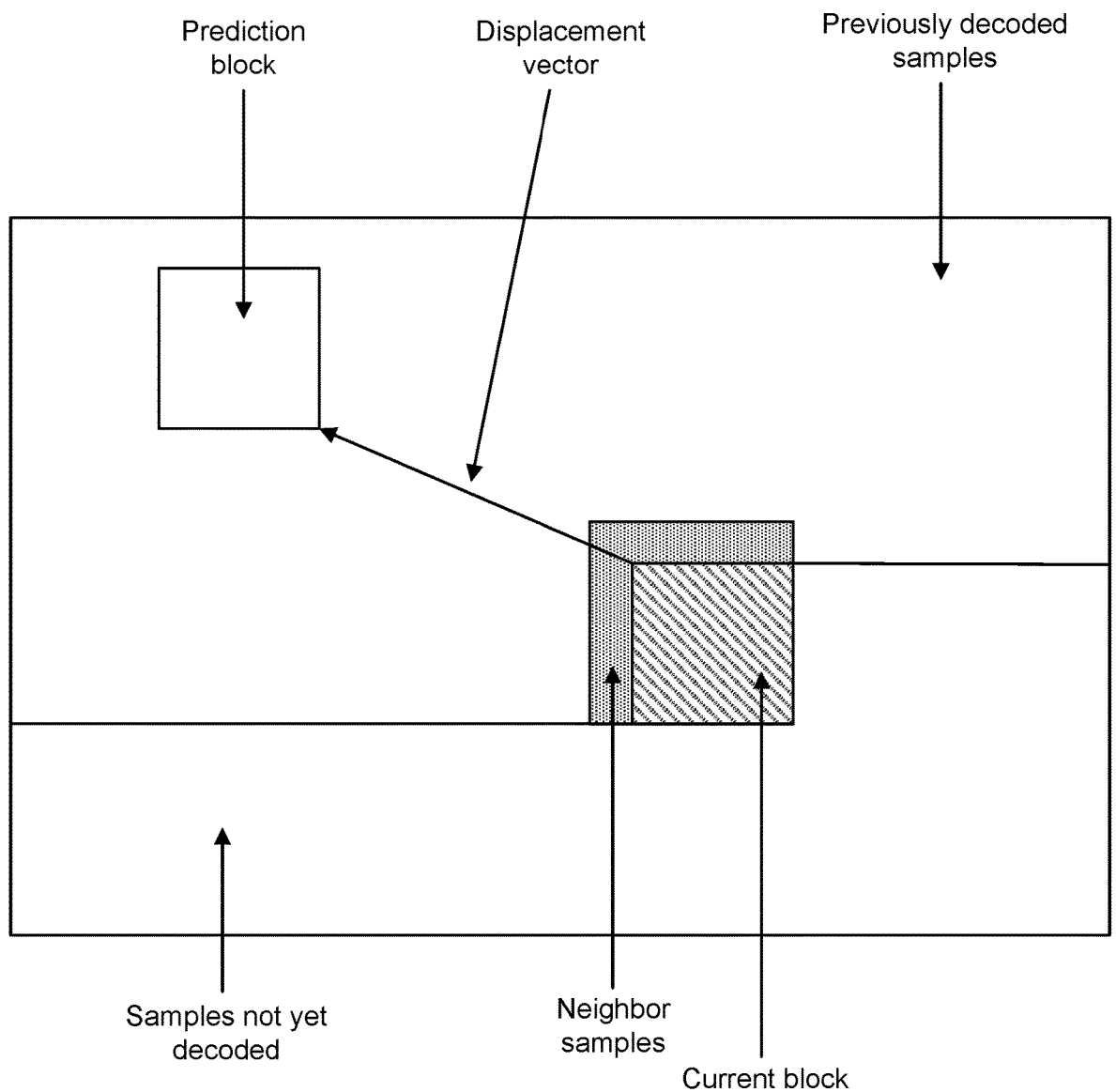
FIG. 11 shows an example of the solution presented herein based on the displacement vector.

In Embodiment 14, which builds from previous embodiments, the second prediction is produced by referencing previously encoded image elements using a displacement vector that is decoded from the bit stream. See FIG. 11 for an example of this embodiment. The displacement vector can either be of full-pixel accuracy or sub-pixel accuracy. When the displacement vector is of sub-pixel accuracy, the referenced image elements may be first interpolated before used as the second set of predicted image elements. The displacement vector may either be the one decoded from the video sequence or a combination of a vector decoded from the video sequence combined with a prediction vector determined from previously decoded image elements.

In Embodiment 15, which builds from Embodiment 14, the decoded displacement vector is aligned relative to the direction of the intra-prediction. As an example, when a diagonal direction is determined for the intra-prediction mode, the decoded displacement vector is first rotated 45 degrees before being used to find the previously decoded reference image elements.

In Embodiment 16, which builds from previous embodiments, a first prediction $S_1$ is produced using intra-prediction, according to the determined intra-prediction mode, from neighboring decoded image elements of the current block. A second prediction $S_2$ is determined from a block of previously decoded image elements located in the same picture as the current block after low frequency variations in the block have been removed. A final prediction P is then produced by a combination of the first prediction $S_1$ and the second prediction $S_2$. A predicted image element of the current block can be described as below for an example of representing low frequency variations by the average value:

$$P(x,y)=S_1(x,y)+(S_2(x,y)-\text{avg}(S_2)) \tag{9}$$

where $\text{avg}(S_2)$ represents the average value of $S_2$, and (x, y) represent the spatial coordinates of a position in the predicted block. The approach described here is to remove low frequency variations from the second prediction before combining it with the first prediction. The intent is to provide high frequencies enhancement from the second prediction.

In one embodiment a weight is applied for the combination as $$P(x,y)=(1-w)S_1(x,y)+w(S_2(x,y)-\text{avg}(S_2)) \tag{10}$$

where $\text{avg}(S_2)$ represents the average value of $S_2$, (x, y) represent the spatial coordinates of a position in the predicted block and w represents a weight that, e.g., gives more weight to the first prediction than the second prediction. The intent is to be able to rely more on the predicted image elements form the first prediction than from the second prediction.

In Embodiment 17, which builds from Embodiment 16, the image elements of the first prediction are modified such that only low frequency variations remains before combining it with the high frequency variations in the second prediction. The intent here is to rely on low frequencies from the first prediction and high frequencies from the second prediction. A predicted image element of the current block can be described as below for an example of representing low frequency variations by the average value:

$$P(x,y)=\text{avg}(S_1)+(S_2(x,y)-\text{avg}(S_2)) \tag{11}$$

where $\text{avg}(S_1)$ represents the average value of $S_1$, $\text{avg}(S_2)$ represents the average value of $S_2$, and (x, y) represent the spatial coordinates of a position in the predicted block.

In Embodiment 18, which builds from previous embodiments, the second prediction is produced from image elements in previously decoded pictures, e.g., using inter-prediction.

In Embodiment 19, which builds from previous embodiments, the image elements in the final prediction are luma or chroma image elements.

In Embodiment 20, which builds from previous embodiments, a final prediction of chroma image elements is produced by using the chroma image elements from previously decoded chroma image elements using the corresponding location as used for producing the second prediction of luma image elements. Then a final chroma prediction is produced using these image elements without considering the intra-prediction or the method used to combine both sets of luma image elements.

In Embodiment 21, which builds from previous embodiments, the current block is decoded using smaller sub-blocks that reuse the same intra-prediction mode. An intra-prediction mode and a method to combine two predictions is determined (method possibly based on the intra-prediction mode). A first subset (smaller than the current block) of predicted image elements is produced from neighboring image elements, and a second subset of equal size of predicted image elements is produced from previously decoded image elements. A final prediction of this subset is produced by combining the two subsets using the combine method determined earlier. A decoded version of the sub-block is created by combing the predicted subset with a residual, created from an inverse transform and quantization of decoded coefficients. The decoded sub-block will be used as a reference when creating the next sub-block of the current block. This process is repeated until the whole block has been decoded.

In one exemplary embodiment, an encoder starts with evaluating which intra-prediction mode minimizes the rate-distortion cost out of all possible (or a subset) of intra-prediction modes for the current block. The rate-distortion cost is evaluated as SSD+$\lambda$*rate. Where the SSD is the mean squared error of the reconstructed image elements, $\lambda$ is a constant that is calculated based on the quantization parameter (QP) used for the current block, and rate is the number of bits signaled in the bit-stream (e.g., the video sequence) required to represent the current block. Based on the best intra-prediction mode, the encoder would then calculate individual weights for each image element position of the block. The weights should be calculated based on which subset of intra-prediction modes the best intra-prediction mode belongs to. The encoder then starts to search locations in previously encoded image elements in an area that is located in a relative close spatial proximity of the current block. For each location, a block with the same size as the current block is selected. The image elements in that block are then weighted together with the image elements from the intra-prediction of the current block using the weighting that was calculated earlier. The weighted image elements form a possible prediction candidate. The encoder then calculates the rate-distortion cost of that candidate by calculating the SSD between the predicted image elements and the original image elements of the current block and adding the bit cost multiplied by $\lambda$. This procedure is then repeated for the next search location and a new rate distortion value is calculated. When all positions have been evaluated, the encoder then selects the position with the lowest rate-distortion value. For each block, the encoder then signals both the intra-prediction mode and the displacement vector that represents the location of the previously encoded image elements.

In one exemplary embodiment, a decoder starts with determining, for each block, which intra-prediction mode should be used, using information that is decoded from the bit stream (e.g., video sequence). The decoder creates a first prediction of the current block by performing the determined intra-prediction. The decoder calculates a set of weights for each image element location in the current block using the same procedure as the encoder based on which subset of intra-prediction modes the intra-prediction mode belongs to. A displacement vector is determined by using information that is decoded from the bit stream. The decoded displacement vector is used to select a location among the previously decoded image elements. The selected image elements are combined with the image elements from the intra-prediction using the weights that was calculated earlier. The decoder uses this prediction to create the final decoded image elements by adding the residual consisting of inverse transformed and de-quantized coefficients which have been decoded from the bit stream.

Various elements disclosed herein are described as some kind of circuit, e.g., a mode circuit, weighting circuit, first prediction circuit, second prediction circuit, decoding circuit, a mode selection circuit, an evaluation circuit, etc. Each of these circuits may be embodied in hardware and/or in software (including firmware, resident software, microcode, etc.) executed on a controller or processor, including an application specific integrated circuit (ASIC).

Further, the solution presented herein may be used for still picture encoding as well.

Another exemplary embodiment considers the possibility of creating more complex predictions by combining different prediction methods. An example of such a method is to combine image element-based intra-prediction and block-based intra-block copy prediction. A similar approach may be used when inter-block prediction is used instead of intra-block copy prediction. Such a combination could remove redundant information with the copying in the block based prediction and at the same time use the well-established method of image element-based intra-prediction. These can be weighted together, in a way that some error metric like SSD or rate distortion is decreased and the visual appearance is improved.

Figure 12:
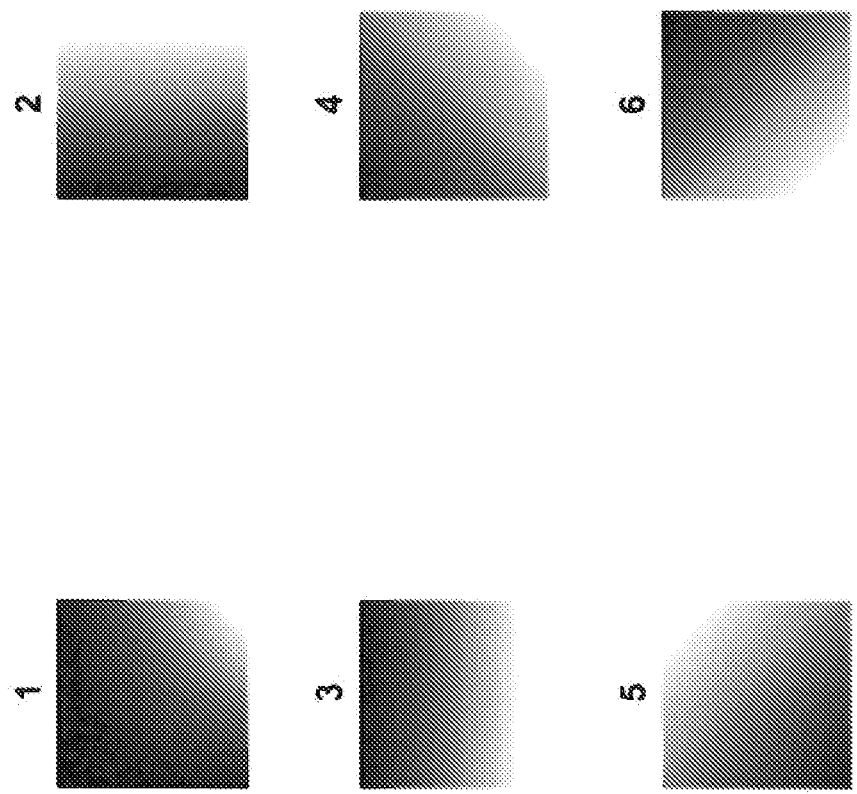
FIG. 12 shows an example of directional weighting according to one exemplary embodiment.

For such a prediction method, a correlation exists between the angle of the intra-prediction mode and the angle of the weights used to combine image elements from both predictions. The image element-based intra-prediction is interpolating in the block with certain angle that makes it better along the edges from where it is interpolated. An example of how to assign weights depending on subsets of the intra-prediction modes is given in the following table (Table 1). This weight assignment technique may be defined in a standard so the encoder and the decoder use the same weightings. See FIG. 12, where the different directional weight matrices for different subsets of intra-prediction modes are used when combining image elements that are produced from intra-prediction and image elements produced using intra-block copy. In FIG. 12, the black color corresponds to the case where only the intra-predicted image elements are considered, and the white color to the case where only image elements from IntraBC predicted block, respectively.

TABLE 1

| Number of weight matrix | Direction of the weights | Intra-prediction modes |
|---|---|---|
| 1 | From left and top edges to bottom right corner | 0-1 |
| 2 | Left edge to right edge | 7-13 |
| 3 | Top edge to bottom edge | 23-29 |
| 4 | Top left corner to bottom right corner | 14-22 |
| 5 | Bottom left corner to upper right corner | 2-6 |
| 6 | Upper right corner to bottom left corner | 30-34 |

Another example of assigning weightings to different intra-prediction modes is to classify the modes into horizontal and vertical modes. In this case a set of weights that are varying in the horizontal direction (weight matrix 2) is used together with the horizontal intra modes (modes 2-17). Similarly another set of weights that are varying in the vertical direction (weight matrix 3) are used for the vertical intra modes (modes 18-34). For the two non-angular intra-prediction modes DC and planar (mode 0 and 1) another set of weights could be used that puts more weights for the top and left edges (weight matrix 1). A variant of this is to reuse the same weights as either the horizontal or vertical intra-prediction modes for the DC and Planar modes.

In one exemplary embodiment, search strategies may be used to determine the best prediction technique. One exemplary search strategy comprises an independent search strategy. In this case, the best image element-based intra-prediction block (intra-prediction mode) and Intra-Block Copy block (location) is found separately to select the one with the least distortion or the least rate distortion. The result is then combined with the appropriate weight matrix according to which subset the intra-prediction mode belongs to.

Another exemplary search strategy comprises a dependent search strategy. In this case, the Intra-Block Copy block (location) is found depending on which combined block gave the least distortion or the least rate distortion. Hence, the Intra-Block Copying is dependent on the Intra-prediction (intra-prediction mode) and weight matrix according to which subset the intra-prediction mode belongs to. So the procedure is as follows:

Choose the image element-based intra-block (intra-prediction mode) as usual by taking the one that gives the least distortion or the least rate distortion.

For all block based intra-blocks in a certain search range (locations), add the image element-based and block-based blocks together with appropriate weight matrix.

Select the location that gives a combination with the least distortion or the least rate distortion.

Another exemplary search strategy comprises a dependent search exhaustive strategy. In this case, the dependent search is as described above: look at all combinations of Intra-prediction mode and Intra-Block Copy block and choose the one with the least distortion or the least rate distortion of the combined block.

Another exemplary search strategy comprises a dependent search with template matching. In this case, the normal Intra-Block Copy method is replaced with the Template Matching method, where the K best blocks are found. The K best block is determined based on distortion for the template area. Then, the best location of the K best block is selected with the least distortion or the least rate distortion of the combined block.

Another exemplary embodiment relies on error metrics. Typically, the error metric includes both a term related to the cost to encode the block multiplied by lambda, which is added to a distortion term that reflects how good the decoded image elements resemble the corresponding original source image elements, e.g., rate distortion. Typically, SSD and SAD are the distortion metrics used to determine which intra-prediction mode to select, and which location to predict from is decided by SSD or SAD. To emphasize the selection of locations of combinations that don't contribute to block artifacts, one can combine the SSD or SAD with an edge metric that measures the distortion along edges of the predicted block. A combined metric can be given by: SSD+k*SSDedge, where k is a constant that determines the relative importance of the edge metric compared to the normal metric. The constant k may also be different for different positions along the block boundary. One example is to adapt k such that it is larger for positions where image elements close to respective position on respective side of the block border do not vary so much as compared to the case where the image elements vary a lot.

Figure 13:
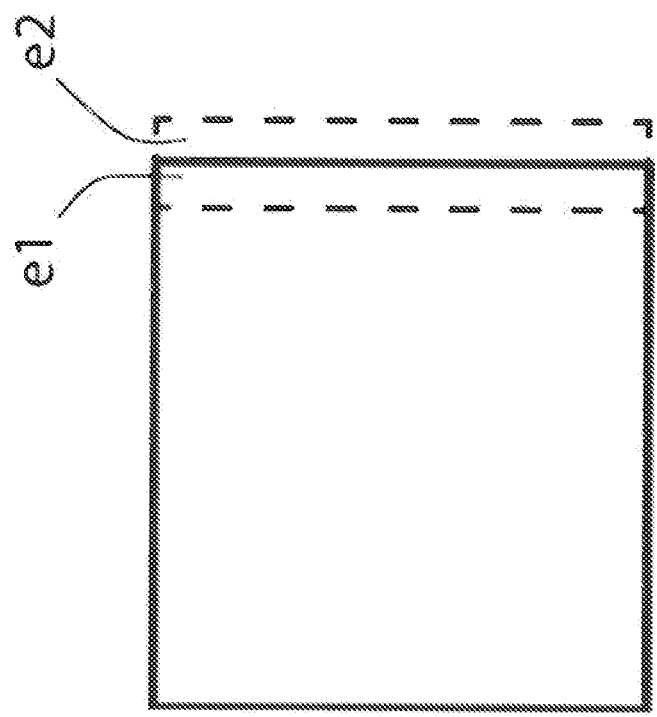
FIG. 13 shows an example of an embodiment that relies on edge metric comparisons.

One example is to do determine the edge metric on image elements along the right edge of the predicted block and the original block respectively, as shown in FIG. 13. In FIG. 13, the proposed edge metric compares the value of an image element on the right edge of the block with the neighbor directly to the right, e1-e2, and then compares this value with a difference computed on corresponding image elements from the original source. The edge metric can be defined as the sum of squared differences along the block boundary, where each difference is provided by comparing the original difference between e1 and e2 on the original source with the difference between e1 and e2 on the predicted block. If the e2 image element not is available due to that the corresponding image element not has been coded yet, the corresponding image element from the original is used instead.

The present solution may, of course, be carried out in other ways than those specifically set forth herein without departing from essential characteristics of the solution presented herein. The present embodiments are to be considered in all respects as illustrative and not restrictive, and all changes coming within the meaning and equivalency range of the appended claims are intended to be embraced therein.

The invention claimed is:

1. A method of decoding a group of image elements in a frame of an encoded video sequence, the method comprising:
   determining an intra-prediction mode for the group of image elements;
   providing a first prediction of the group of image elements according to the determined intra-prediction mode;
   determining a location identifier identifying a location of a decoded version of another group of image elements in a frame of the video sequence;
   providing a second prediction of the group of image elements using the determined location identifier;
   identifying which subset of a plurality of subsets of intra-prediction modes contains the determined intra-prediction mode, wherein each subset corresponds to a first weighting and a second weighting assigned for all intra-prediction modes of that subset, and wherein different subsets are assigned different first weightings and different second weightings;
   applying at least one of the first weighting assigned to the identified subset to the first prediction to generate a first weighted prediction and the second weighting assigned to the identified subset to the second prediction to generate a second weighted prediction; and
   generating a decoded version of the group of image elements using a combination of the first prediction and the second weighted prediction or using a combination of the first weighted prediction and the second prediction or using a combination of the first weighted prediction and the second weighted prediction.

2. A computer program product comprising a non-transitory computer readable medium comprising software instructions for causing a processor to perform the method of claim 1.

3. The method of claim 1, wherein generating a decoded version of the group of image elements using (i) a combination of the first prediction and the second weighted prediction or (ii) a combination of the first weighted prediction and the second prediction.

4. A decoder comprising:
   a mode circuit configured to determine an intra-prediction mode for a group of image elements in a frame of a video sequence, and to determine a location identifier identifying a location of a decoded version of another group of image elements in a frame of the video sequence;

a first prediction circuit configured to provide a first prediction of the group of image elements using intra-prediction according to the determined intra-prediction mode;

a second prediction circuit configured to provide a second prediction of the group of image elements using the determined location identifier;

a weighting circuit configured to:

i) identify which subset of a plurality of subsets of intra-prediction modes contains the determined intra-prediction mode, wherein each subset corresponds to a first weighting and a second weighting assigned for all intra-prediction modes of that subset, and wherein different subsets are assigned different first weightings and different second weightings; and ii) apply at least one of the first weighting assigned to the identified subset to the first prediction to generate a first weighted prediction and the second weighting assigned to the identified subset to the second prediction to generate a second weighted prediction; and a decoding circuit configured to generate a decoded version of the group of image elements using a combination of the first prediction and the second weighted prediction or using a combination of the first weighted prediction and the second prediction or using a combination of the first weighted prediction and the second weighted prediction.

5. The decoder of claim 4, wherein each first weighting comprises a first weight for each element of the group of image elements, and wherein each second weighting comprises a second weight for each element of the group of image elements.

6. The decoder of claim 5, wherein at least some of the first weights differ from other ones of the first weights, and wherein at least some of the second weights differ from other ones of the second weights.

7. The decoder of claim 4, wherein when decoded image elements used for the second prediction are coded with a lower Quantization parameter than the Quantization parameter used for decoded image elements used for the first prediction, the second weighting is greater than the first weighting.

8. The decoder of claim 4, wherein the second prediction circuit is configured to provide the second prediction of the group of image elements according to one of an intra-block prediction and an inter-block prediction.

9. The decoder of claim 8, wherein when the second prediction is provided according to the inter-block prediction, the second weighting is greater than the first weighting.

10. The decoder of claim 4, wherein the decoder is further configured to receive a combination flag with the encoded video sequence, wherein the decoding circuit is configured to generate the decoded version of the group of image elements by:

when the combination flag is enabled, generating the decoded version of the group of image elements using the combination; and when the combination flag is not enabled, generating the decoded version of the group of image elements using the first prediction or the second prediction.

11. The decoder of claim 4:

wherein the decoder is further configured to receive a weight scaling factor having a value between 0 and a positive non-zero constant with the encoded video sequence, said weight scaling factor configured to emphasize one of the first and second weightings over the other of the first and second weightings to further control an influence of one of the first and second predictions on the generated decoded version; and wherein the weighting circuit is further configured to use the weight scaling factor to adjust at least one of the first and second weightings.

12. The decoder of claim 4, wherein the decoder is comprised in a device.

13. The decoder of claim 12, wherein the device comprises one of a tablet, personal computer, mobile telephone, set-top box, and camera.

14. A method of encoding a group of image elements in a frame of a video sequence, the method comprising:

selecting from a plurality of intra-prediction modes an intra-prediction mode for a first group of image elements;

identifying which subset of a plurality of subsets of intra-prediction modes contains the selected intra-prediction mode, wherein each subset of intra-prediction modes corresponds to a first weighting and a second weighting calculated for all intra-prediction modes of that subset, and wherein different first weightings and different second weightings are calculated for different subsets;

obtaining a first prediction of the first group of image elements using intra-prediction according to the selected intra-prediction mode;

applying the first weighting assigned to the identified subset to the first prediction to generate a first weighted prediction;

obtaining a plurality of weighted predictions comprising a second weighted prediction and a third weighted prediction, wherein (i) the second weighted prediction is obtained by applying the second weighting for the identified subset to a second group of image elements previously encoded and proximate the first group of image elements, wherein the second group of image elements is located at a different location from the first group of image elements;

(ii) the third weighted prediction is obtained by applying the second weighting for the identified subset to a third group of image elements previously encoded and proximate the first group of image elements, wherein the third group of image elements is located at a different location from the first group of image elements;

determining a plurality of candidate predictions, each candidate prediction comprising (i) a combination of the first prediction and one of the obtained plurality of weighted predictions, (ii) a combination of the first weighted prediction and the second or third group of image elements, or (iii) a combination of the first weighted prediction and one of the plurality of weighted predictions;

selecting from the determined plurality of candidate predictions a candidate prediction having a better performance parameter than the other candidate predictions; and encoding the first group of image elements using the selected candidate prediction.

15. A computer program product comprising a non-transitory computer readable medium comprising software instructions for causing a processor to perform the method of claim 14.

16. The method of claim 14, wherein generating a decoded version of the group of image elements using (i) a combination of the first prediction and one of the plurality of the weighted predictions or (ii) a combination of the first weighted prediction and the second or third group of image elements.

17. An encoder comprising:
- a mode selection circuit configured to select from a plurality of intra-prediction modes an intra-prediction mode for a first group of image elements in a frame of a video sequence;
- a weighting circuit configured to identify which subset of a plurality of subsets of intra-prediction modes contains the selected intra-prediction mode, wherein each subset of intra-prediction modes corresponds to a first weighting and a second weighting calculated for all intra-prediction modes of that subset, and wherein different first weightings and different second weightings are calculated for different subsets;
- a first prediction circuit configured to:
  i) obtain a first prediction of the first group of image elements using intra-prediction according to the selected intra-prediction mode; and
  ii) apply the first weighting assigned to the identified subset to the first prediction to generate a first weighted prediction;
- a second prediction circuit configured to obtain a plurality of weighted predictions comprising a second weighted prediction and a third weighted prediction, wherein (i) the second weighted prediction is obtained by applying the second weighting for the identified subset to a second group of image elements previously encoded and proximate the first group of image elements, the second group of image elements being located at a different location from the first group of image elements and (ii) the third weighted prediction is obtained by applying the second weighting for the identified subset to a third group of image elements previously encoded and proximate the first group of image elements, the third group of image elements being located at a different location from the first group of image elements; and
- an evaluation circuit configured to:
  i) determine a plurality of candidate predictions, each candidate prediction comprising (i) a combination of the first prediction and one of the obtained plurality of weighted predictions, (ii) a combination of the first weighed prediction and the second or third group of image elements, or (iii) a combination of the first weighted prediction and one of the plurality of weighted predictions;
  ii) select from the determined plurality of candidate predictions a candidate prediction having a better performance parameter than the other candidate predictions; and
  ii) encode the first group of image elements using the selected candidate prediction.

18. The encoder of claim 17, wherein each first weighting calculated for each subset comprises a first weight for each element of the first group of image elements, and wherein each second weighting comprises a second weight for each element of the second group of second image elements.

19. The encoder of claim 17, wherein the encoder is configured to signal a combination flag with the encoded video sequence, said combination flag indicating when the encoded video sequence is derived from a combination of encoded image elements.

20. The encoder of claim 17, wherein the encoder is configured to signal a weight scaling factor between 0 and a positive non-zero constant with the encoded video sequence, said weight scaling factor configured to emphasize one of the first and second weightings over the other of the first and second weightings to further control an influence of one of the first and second predictions on the combination.

21. The encoder of claim 17, wherein the encoder is comprised in a device.

22. The encoder of claim 21, wherein the device comprises one of a tablet, personal computer, mobile telephone, set-top box, and camera.

* * * * *